United States Patent
Kjos et al.

(10) Patent No.: US 6,895,491 B2
(45) Date of Patent: May 17, 2005

(54) MEMORY ADDRESSING FOR A VIRTUAL MACHINE IMPLEMENTATION ON A COMPUTER PROCESSOR SUPPORTING VIRTUAL HASH-PAGE-TABLE SEARCHING

(75) Inventors: Todd Kjos, Los Altos, CA (US); Jonathan Ross, Woodinville, WA (US); Christophe de Dinechin, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 237 days.

(21) Appl. No.: 10/260,645

(22) Filed: Sep. 26, 2002

(65) Prior Publication Data

US 2004/0064668 A1 Apr. 1, 2004

(51) Int. Cl.[7] .............................................. G06F 12/00
(52) U.S. Cl. ........................... 711/203; 711/6; 711/173; 711/202; 711/203; 711/206; 711/207
(58) Field of Search ............................. 711/6, 200, 202, 711/203, 205, 207

(56) References Cited

U.S. PATENT DOCUMENTS

| | | | | |
|---|---|---|---|---|
| 5,381,535 A | * | 1/1995 | Gum et al. | 718/105 |
| 5,555,385 A | * | 9/1996 | Osisek | 711/1 |
| 5,758,050 A | * | 5/1998 | Brady et al. | 714/1 |
| 6,510,496 B1 | * | 1/2003 | Tarui et al. | 711/147 |
| 6,651,132 B1 | * | 11/2003 | Traut | 711/6 |
| 6,681,238 B1 | * | 1/2004 | Brice et al. | 718/1 |
| 6,789,156 B1 | * | 9/2004 | Waldspurger | 711/6 |
| 2002/0069335 A1 | * | 6/2002 | Flylnn, Jr. | |
| 2002/0194496 A1 | | 12/2002 | Griffin et al. | |
| 2003/0221115 A1 | * | 11/2003 | Itoh et al. | |
| 2004/0025158 A1 | * | 2/2004 | Traut | |
| 2004/0054518 A1 | * | 3/2004 | Altman et al. | |

* cited by examiner

*Primary Examiner*—Donald Sparks
*Assistant Examiner*—Ngoc V Dinh

(57) ABSTRACT

A software monitor, interposed between the hardware layer of a computer system and one or more guest operating systems, constructs and maintains a guest-physical-address-to-host-physical-address map for each guest operating system, and maintains a virtual memory addressing context for each guest operating system that may include a virtual-hash-page table for each guest operating system, the contents of translation registers for each guest operating system, CPU-specific virtual-memory translations for each guest operating system, and the contents of various status registers. The monitor runs at the highest privilege level provided by the hardware system, intercepting attempts to execute privileged instructions by guest operating systems, and simulates or enhances certain of the privileged instructions related to virtual-memory addressing in order to construct and maintain the guest-physical-address-to-host-physical-address map and to provide each guest operating system with the illusion that the guest operating system is executing as the most privileged process on a virtual machine.

21 Claims, 28 Drawing Sheets

| TLB.ar | TLB.pl | \ PRIVILEGE LEVEL / | | | | DESCRIPTION |
|---|---|---|---|---|---|---|
| | | 3 | 2 | 1 | 0 | |
| 0 | 3 | R | R | R | R | READ ONLY |
| | 2 | | R | R | R | |
| | 1 | | | R | R | |
| | 0 | | | | R | |
| 1 | 3 | RX | RX | RX | RX | READ, EXECUTE |
| | 2 | | RX | RX | RX | |
| | 1 | | | RX | RX | |
| | 0 | | | | RX | |
| 2 | 3 | RW | RW | RW | RW | READ, WRITE |
| | 2 | | RW | RW | RW | |
| | 1 | | | RW | RW | |
| | 0 | | | | RW | |
| 3 | 3 | RWX | RWX | RWX | RWX | READ, WRITE, EXECUTE |
| | 2 | | RWX | RWX | RWX | |
| | 1 | | | RWX | RWX | |
| | 0 | | | | RWX | |
| 4 | 3 | R | RW | RW | RW | READ ONLY/READ, WRITE |
| | 2 | | R | RW | RW | |
| | 1 | | | R | RW | |
| | 0 | | | | RW | |
| 5 | 3 | RX | RX | RX | RWX | READ, EXECUTE/READ, WRITE, EXEC |
| | 2 | | RX | RX | RWX | |
| | 1 | | | RX | RWX | |
| | 0 | | | | RWX | |
| 6 | 3 | RWX | RW | RW | RW | READ, WRITE, EXECUTE/READ, WRITE |
| | 2 | | RWX | RW | RW | |
| | 1 | | | RWX | RW | |
| | 0 | | | | RW | |
| 7 | 3 | X | X | X | RX | EXEC, PROMOTE/READ, EXECUTE |
| | 2 | XP2 | X | X | RX | |
| | 1 | XP1 | XP1 | X | RX | |
| | 0 | XP0 | XP0 | XP0 | RX | |

Fig. 7

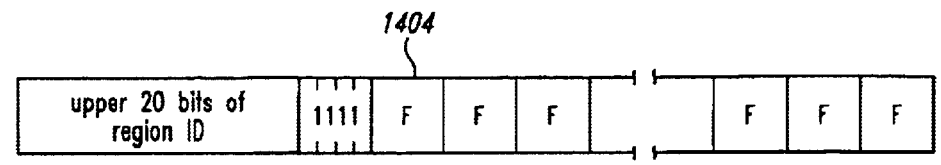
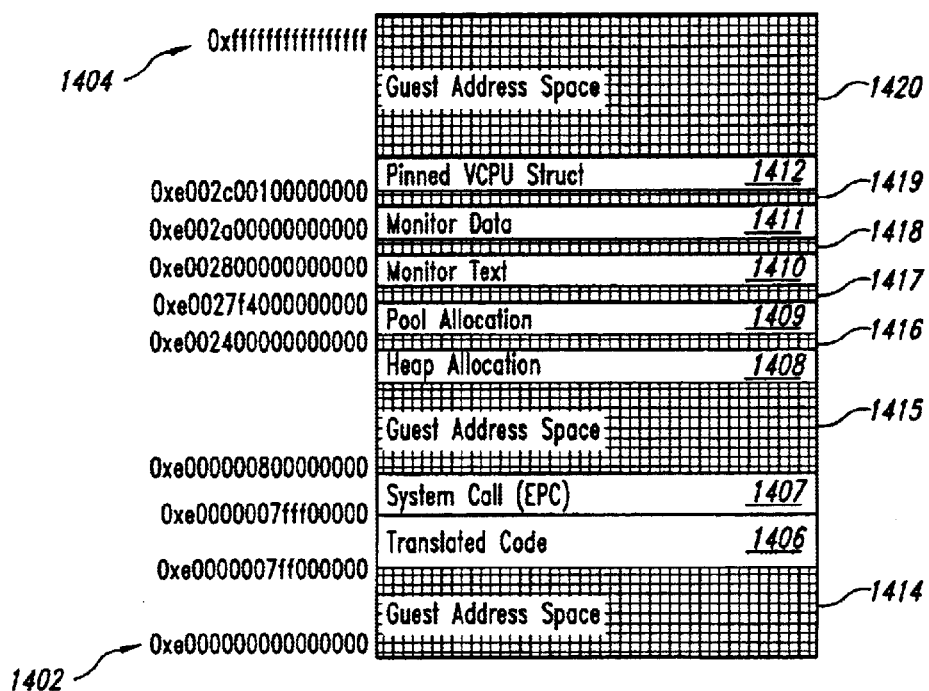
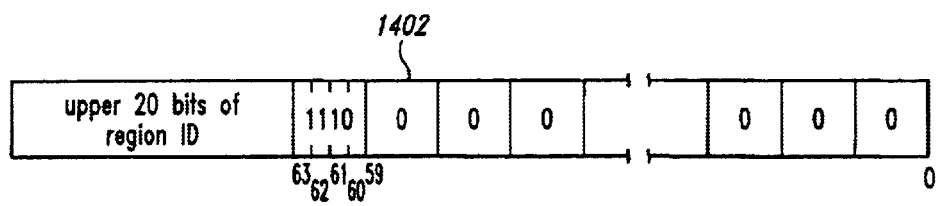
Fig. 14

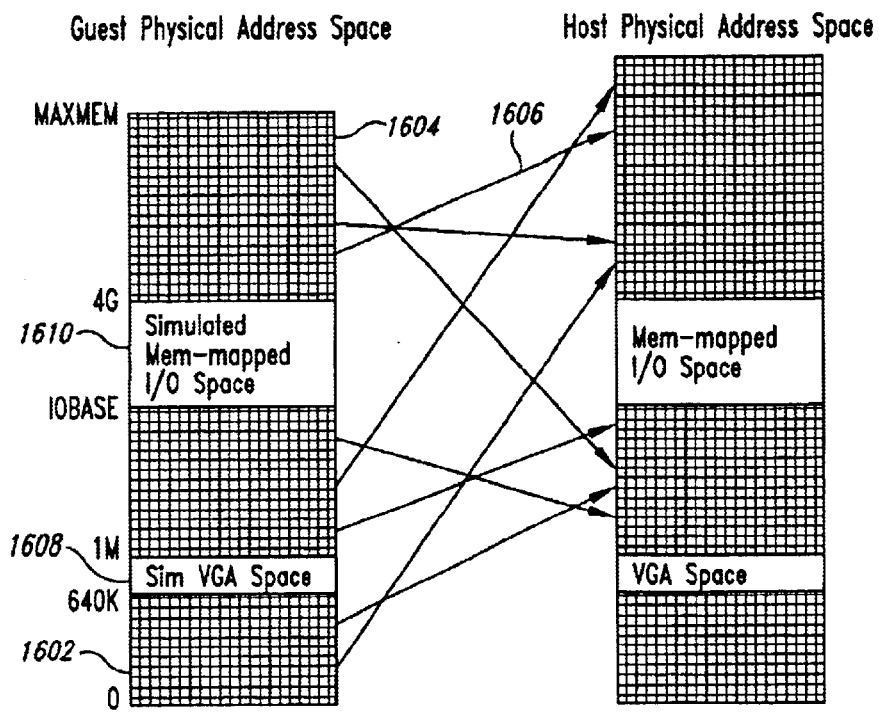
*Fig. 16*
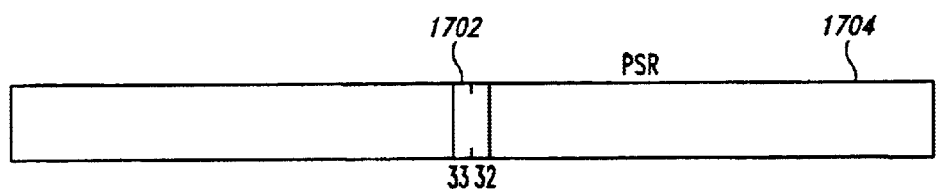
*Fig. 17A*
| Monitor | PL0 |
| --- | --- |
| guest OSs | PL1 |
| other | PL2 |
| other | PL3 |
*Fig. 17B*

| M | I | D | C | STATE | |
|---|---|---|---|---|---|
| 0 | 0 | 0 | 0 | U | Unmapped |
| 1 | 0 | 0 | 0 | M | Mapped |
| 0 | 1 | 0 | 0 | IU | Instruction-only Unmapped |
| 1 | 1 | 0 | 0 | IM | Instruction-only Mapped |
| 0 | 0 | 1 | 0 | DU | Data-only Unmapped |
| 1 | 0 | 1 | 0 | DM | Data-only Mapped |
| 1 | 1 | 0 | 1 | CIM | Mapped page coalesced with IM |
| 1 | 0 | 1 | 1 | CDM | Mapped page coalesced with DM |

MEMORY ADDRESSING FOR A VIRTUAL MACHINE IMPLEMENTATION ON A COMPUTER PROCESSOR SUPPORTING VIRTUAL HASH-PAGE-TABLE SEARCHING

TECHNICAL FIELD

The present invention relates to computer architecture and operating systems and, in particular, to a method for providing virtual address spaces to multiple guest operating systems concurrently running on a host computer using host-computer machine-architectural support for virtual-memory-address-translation caching and translation-cache searching.

BACKGROUND OF THE INVENTION

Computer architectures and operating systems have evolved, in parallel, over the past 40 years to provide large virtual-memory address spaces to processes executing on computer systems. The operating system provides to a process, executing within an execution environment provided by the operating system, a large virtual-memory address space by swapping pages between a generally smaller physical memory and mass-storage devices and by mapping virtual-memory addresses to physical-memory addresses.

FIG. 1 illustrates virtual memory provided by a combined operating-system/hardware system. In FIG. 1, the operating system is abstractly represented as a circle 102 enclosing hardware components including a processor 104, physical memory 106, and mass-storage devices 108. FIG. 1 is intended to abstractly represent certain features of the hardware system, or machine, rather than to accurately represent a machine or enumerate the components of a machine. In general, the operating system provides, to each process executing within the execution environment provided by the operating system, a large virtual-memory address space, represented in FIG. 1 by vertical columns external to the operating system, such as vertical column 110. The virtual-memory address space defines a sequence of addressable memory bytes with addresses ranging from 0 to $2^{64}-1$ for a combined operating-system/hardware system supporting 64-bit addresses. Depending on the machine and operating system, certain portions of the virtual-memory address space may be inaccessible to a process, and various mechanisms may be used to extend the size of the virtual-memory address space beyond the maximum size addressable by the machine-supported addressing unit. An operating system generally provides a separate virtual-memory address space to each process concurrently executing on top of the operating system, so that, as shown in FIG. 1, the operating system may simultaneously support a number of distinct and separate virtual-memory address spaces 110–114.

A virtual-memory address space is, in many respects, an illusion created and maintained by the operating system. A process or thread executing on the processor 104 can generally access only a portion of physical memory 106. Physical memory may constitute various levels of caching and discrete memory components distributed between the processor and separate memory integrated circuits. The physical memory addressable by an executing process is often smaller than the virtual-memory address space provided to a process by the operating system, and is almost always smaller than the aggregate size of the virtual-memory address spaces simultaneously provided by the operating system to concurrently executing processes. The operating system creates and maintains the illusion of relatively vast virtual-memory address spaces by storing the data, addressed via a virtual-memory address space, on mass-storage devices 108 and rapidly swapping portions of the data, referred to as pages, into and out from physical memory 106 as demanded by virtual-memory accesses made by executing processes. In general, the patterns of access to virtual memory by executing programs are highly localized, so that, at any given instant in time, a program may be reading to, and writing from, only a relatively small number of virtual-memory pages. Thus, only a comparatively small fraction of virtual-memory accesses require swapping of a page from mass-storage devices 108 to physical memory 106.

Generally, an operating system makes use of special registers, instructions, and firmware services provided by and for modern processors in order to efficiently implement virtual memory. Initially, these specialized registers, instructions, and machine-level routines were designed to support a single operating system. However, designers and manufacturers of computer systems currently seek to allow multiple operating systems to concurrently run on a given computer system. Thus, computer-system designers and manufacturers have recognized the need for methods and techniques for efficiently providing virtual memory services to multiple, concurrently executing operating systems to allow the multiple, concurrently executing operating systems to provide multiple virtual-memory address spaces to processes executing within the execution environments provided by the multiple, concurrently executing operating systems.

SUMMARY OF THE INVENTION

One embodiment of the present invention employs a software monitor interposed between the hardware layer of a computer system and one or more guest operating systems. The monitor partitions region identifiers and distributes sets of region identifiers to guest operating systems for their exclusive use. The monitor constructs and maintains a guest-physical-address-to-host-physical-address map for each guest operating system, and maintains a virtual memory addressing context for each guest operating system that may include a virtual-hash-page table for each guest operating system, a virtual translation-look-aside buffer for each guest operating system, and the contents of various status registers. Upon transferring control of a processor from a currently active operating system to a dormant operating system, the monitor stores the current virtual memory addressing context for the currently active operating system and restores the virtual-memory addressing context for the dormant operating system. The monitor runs at the most privileged privilege level provided by the hardware system, while guest operating systems operate at less privileged privilege levels. The monitor therefore intercepts attempts to execute privileged instructions by guest operating systems, and simulates or enhances certain of the privileged instructions related to virtual-memory addressing in order to construct and maintain the guest-physical-address-to-host-physical-address map and to provide each guest operating system with the illusion that the guest operating system is executing as the most privileged process on the machine.

BRIEF DESCRIPTION OF THE DRAWINGS

FIG. 7 shows the access rights encoding used in a TLB entry.

FIG. 14 illustrates the contents of the virtual-memory region specified by the contents of region register 7 in one embodiment of the present invention.

FIG. 16 illustrates mapping of guest physical address space to host physical address space in one embodiment of the present invention.

FIG. 17 illustrates the partitioning of privilege level by the monitor in one embodiment of the present invention.

DETAILED DESCRIPTION OF THE INVENTION

One embodiment of the present invention provides a method for supporting multiple virtual-memory address spaces provided by multiple, concurrently executing guest operating systems to application-program processes and other processes and threads running within the execution environments provided by the guest operating systems. The described embodiment specifically relates to the Intel® IA-64 machine architecture, although the method of the present invention is applicable to other modern processors that provide features similar to those provided by the Intel® IA-64 machine architecture.

Figure 2:
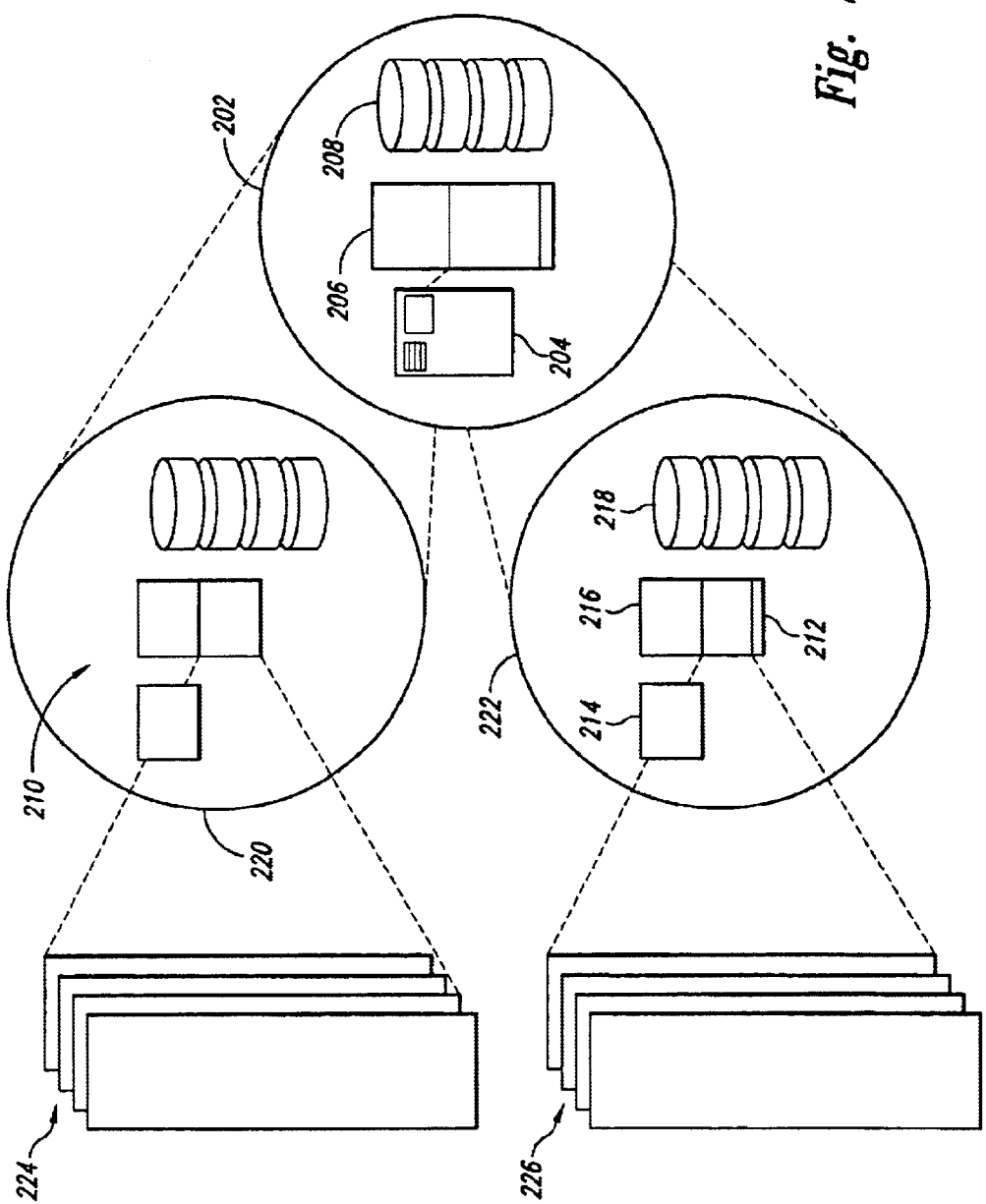
FIG. 2 illustrates a monitor-based approach to supporting multiple, concurrently executing operating systems.

FIG. 2 illustrates a monitor-based approach to supporting multiple, concurrently executing operating systems. In FIG. 2, a first circle 202 encloses the physical processor 204, physical memory 206, and mass-storage devices 208 of a computer system. The first enclosing circle 202 represents a monitor, a software layer underlying the traditional operating-system software layer of the computer system. The monitor, also referred to as a "hypervisor," provides a virtual machine, such as virtual machines 210 and 212 in FIG. 2, to each operating system concurrently executing on the computer system, the operating systems running above virtual machines referred to as "guest operating systems.". The virtual machine can be considered to include a virtual processor, virtual physical memory, and virtual mass-storage devices, e.g., 214, 216, 218, respectively. An operating system software layer can be considered to encapsulate each virtual machine, such as operating systems 220 and 222 represented by circles in FIG. 2. In turn, the operating systems each provide a number of guest-virtual-memory address spaces 224 and 226 to processes concurrently executing within the execution environments provided by the operating systems. The monitor may provide multiple virtual processors to guest operating systems, and may provide a different number of virtual processors than the number of physical processors contained in the computer system.

Figure 1:
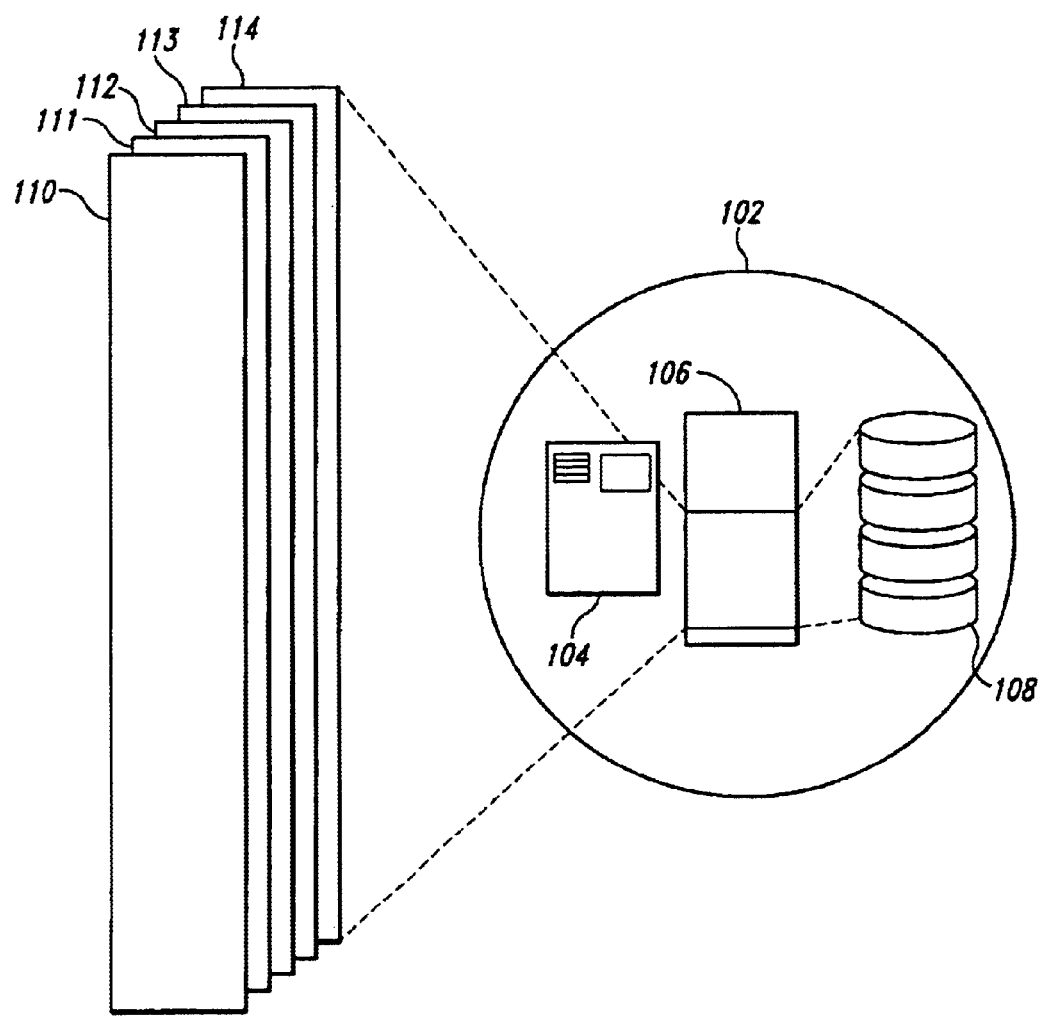
FIG. 1 illustrates virtual memory provided by a combined operating-system/hardware system.

Contrasting the traditional virtual-memory implementation illustrated in FIG. 1, with the monitor-based virtual-memory implementation illustrated in FIG. 2, it can be seen that the virtual-memory address spaces 224 and 226 provided to executing processes in the monitor-based system, in contrast to the traditional operating-system/hardware system of FIG. 1, are removed from actual physical memory by an additional layer of abstraction, namely the guest address spaces 216 provided by the monitor 202 to each guest operating system 220 and 222. Although only two virtual machines and concurrently executing guest operating systems are shown in FIG. 2, the monitor-based approach can support many more than two concurrently executing operating systems.

One embodiment of the present invention provides specific techniques for efficiently implementing the 2-level virtual-memory abstraction illustrated in FIG. 2. In order to describe those techniques, relevant features of the Intel® IA-64 architecture are first provided, below, in a first subsection, as an example modern processor architecture to which the methods of the present invention can be applied. Then, in the second subsection, the techniques that represent one embodiment of the present invention are detailed.

An implementation of virtual-memory-related portions of a monitor are included in two copies of a compact disks submitted along with the current application, and are hereby incorporated by reference. Each copy of the compact disk includes the following files:

| Files | Size (KB) | Date Created |
| --- | --- | --- |
| context.h | 9 | Sep. 24, 2002 10:53 PM |
| fault.c | 31 | Sep. 24, 2002 10:53 PM |
| gphys.c | 23 | Sep. 24, 2002 10:53 PM |
| guest.h | 4 | Sep. 24, 2002 10:53 PM |
| ivt.h | 4 | Sep. 24, 2002 10:53 PM |
| ivt.s | 55 | Sep. 24, 2002 10:53 PM |
| mm.h | 8 | Sep. 24, 2002 10:53 PM |
| mmdefs.h | 10 | Sep. 24, 2002 10:53 PM |
| mmemu.c | 35 | Sep. 24, 2002 10:53 PM |
| mmemu.h | 3 | Sep. 24, 2002 10:53 PM |
| mminit.c | 9 | Sep. 24, 2002 10:53 PM |
| mmxlate.c | 20 | Sep. 24, 2002 10:53 PM |
| pte.c | 38 | Sep. 24, 2002 10:53 PM |
| regStruct.h | 42 | Sep. 24, 2002 10:53 PM |
| regUsage.h | 3 | Sep. 24, 2002 10:53 PM |
| vcpu.h | 5 | Sep. 24, 2002 10:53 PM |

A Modern Computer Architecture

Figure 3:
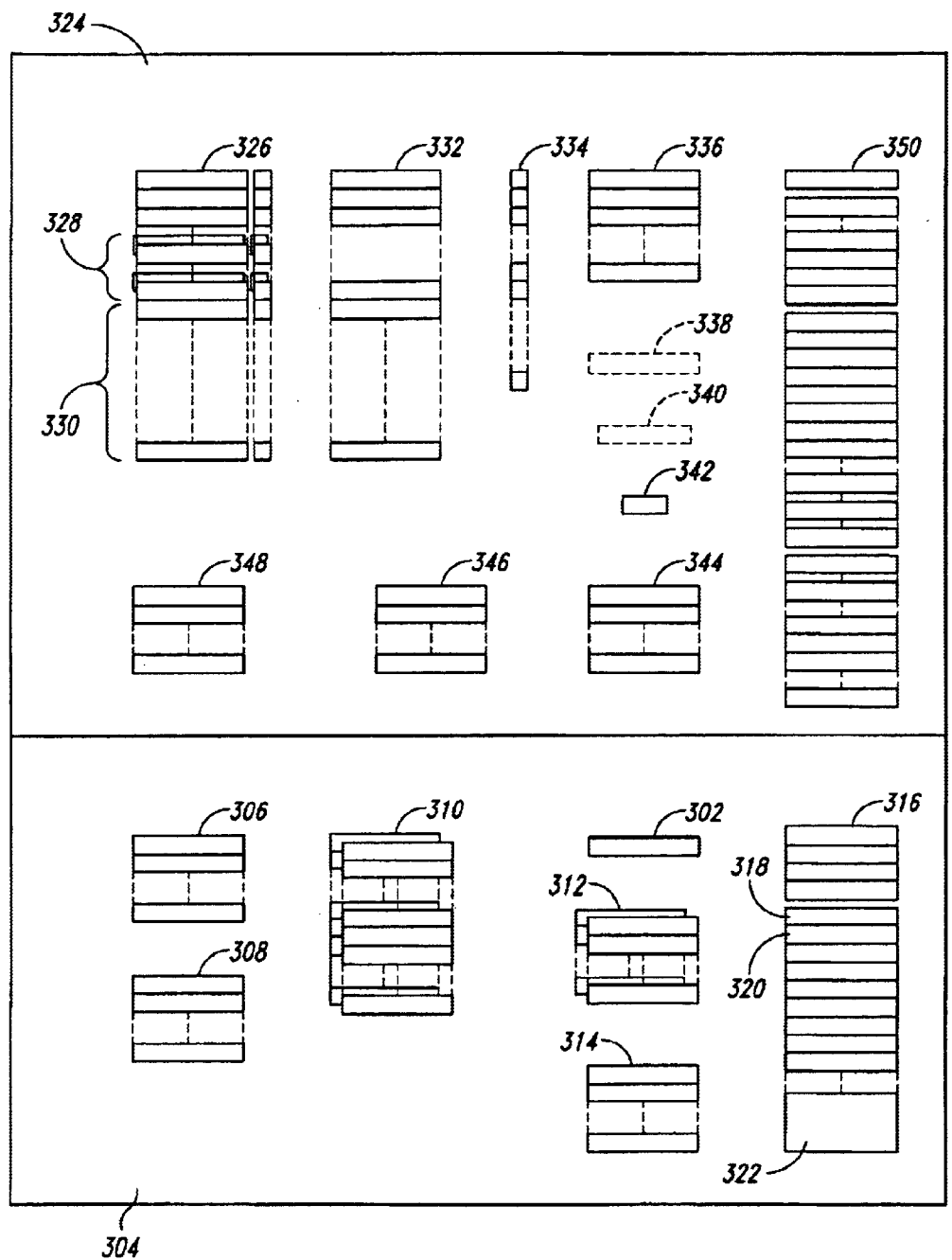
FIG. 3 is a block diagram showing the registers within one type of modem processor.

Processors, such as Intel Itanium® processors, built to comply with the Intel® IA-64 computer architecture represent one example of a modern computer hardware platform suitable for supporting a monitor-based virtual machine that in turn supports multiple guest-operating-systems, in part by providing a virtual physical memory and virtual-address translation facilities to each guest operating system. FIG. 3 is a block diagram showing the registers within an exemplary IA-64 processor. The registers hold values that define the execution state of the processor, and, when saved to memory, capture the machine state of an executing process prior to stopping execution of the process. Restoring certain registers saved in memory allows for resumption of execution of an interrupted process. The register set shown in FIG. 3 is quite complex, and only certain of the more important registers are described, below.

One important register is the process status register ("PSR") 302. The PSR is a 64-bit register that contains control information for the currently executing process. The PSR comprises many bit fields, including a 2-bit field that contains the current privilege level ("CPL") at which the currently executing process is executing. There are four privilege levels: 0, 1, 2, and 3. The most privileged privilege level is privilege level 0. The least privileged privilege level is privilege level 3. Only processes executing at privilege level 0 are allowed to access and manipulate certain machine resources, including the subset of registers, known as the "system-register set," shown in FIG. 3 within the lower rectangle 304. These system registers include a set of region registers 306, a set of protection-key registers 308, data and instruction translation-look-aside-buffer registers 310, a set of debug-break-point registers 312, a set of performance-monitor-configuration registers 314, and a set of control registers 316. One control register, the interruption processor status register ("IPSR") 318, stores the value of the PSR for the most recently interrupted process. The interruption status register ("ISR") 320 contains a number of fields that indicate the nature of the interruption that most recently occurred. Other control registers store information related to other events, such as virtual memory address translation information related to a virtual address translation fault, pointers to the last successfully executed instruction bundle, and other such information. Sets of external control interrupt registers 322 are used, in part, to set interrupt vectors.

The registers shown in FIG. 3 in the upper rectangular region 324 are known as the "application-register set." These registers include a set of general registers 326, sixteen of which 328 are banked in order to provide immediate registers for interruption handling code. At least 96 general registers 330 form a general-register stack, portions of which may be automatically stored and retrieved from backing memory to facilitate linkages among calling and called software routines. The application-register set also includes floating point registers 332, predicate registers 334, branch registers 336, an instruction pointer 338, a current frame marker 340, a user mask 342, performance monitor data registers 344, processor identifiers 346, an advanced load address table 348, and a set of specific application registers 350.

The memory and virtual-address-translation architecture of the IA-64 computer architecture is described below, with references to FIGS. 4–7. The virtual address space defined within the Intel IA-64 computer architecture includes $2^{24}$ regions, such as regions 402–407 shown in FIG. 4, each containing $2^{61}$ bytes that are contiguously addressed by successive virtual memory addresses. Thus, the virtual memory address space can be considered to span a total address space of $2^{85}$ bytes of memory. An 85-bit virtual memory address 408 can then be considered to comprise a 24-bit region field 410 and a 61-bit address field 412.

Figure 5:
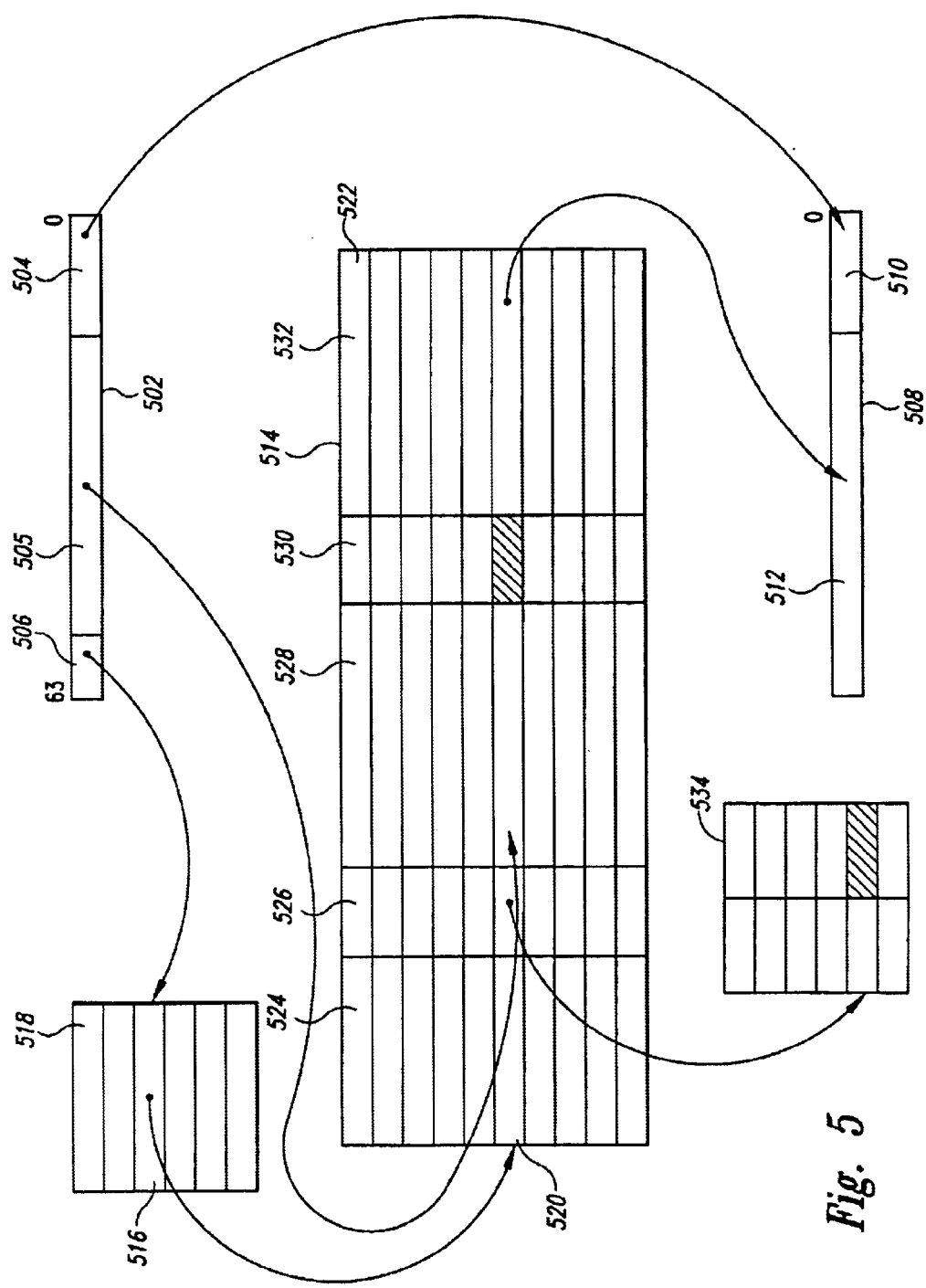
FIG. 5 illustrates translation of a virtual memory address into a physical memory address via information stored within region registers, protection key registers, and a translation look-aside buffer.

In general, however, virtual memory addresses are encoded as 64-bit quantities. FIG. 5 illustrates translation of a 64-bit virtual memory address into a physical memory address via information stored within region registers, protection key registers, and a translation look-aside register buffer ("TLB"). In the Intel® IA-64 architecture, virtual addresses are 64-bit computer words, represented in FIG. 5 by a 64-bit quantity 502 divided into three fields 504–506. The first two fields 504 and 505 have sizes that depend on the size of a memory page, which can be adjusted within a range of memory page sizes. The first field 504 is referred to as the "offset." The offset is an integer designating a byte within a memory page. If, for example, a memory page contains 4096 bytes, then the offset needs to contain 12 bits to represent the values 0–4095. The second field 505 contains a virtual page address. The virtual page address designates a memory page within a virtual address space that is mapped to physical memory, and further backed up by memory pages stored on mass storage devices, such as disks. The third field 506 is a three-bit field that designates a region register containing the identifier of a region of virtual memory in which the virtual memory page specified by the virtual page address 505 is contained.

Translation of the virtual memory address 502 to a physical memory address 508 that includes the same offset 510 as the offset 504 in the virtual memory address, as well as a physical page number 512 that references a page in the physical memory components of the computer system, is carried out by the processor, at times in combination with operating-system-provided services. If a translation from a virtual memory address to a physical memory address is contained within the TLB 514, then the virtual-memory-address-to-physical-memory-address translation can be entirely carried out by the processor without operating system intervention. The processor employs the region register selector field 506 to select a register 516 within a set of region registers 518. The selected region register 516 contains a 24-bit region identifier. The processor uses the region identifier contained in the selected region register and the virtual page address 505 together in a hardware function to select a TLB entry 520 containing a region identifier and virtual memory address that match the region identifier contained in the selected region register 516 and the virtual page address 505. Each TLB entry, such as TLB entry 522, contains fields that include a region identifier 524, a protection key associated with the memory page described by the TLB entry 526, a virtual page address 528, privilege and access mode fields that together compose an access rights field 530, and a physical memory page address 532.

If an entry in the TLB can be found that contains the region identifier contained within the region register specified by the region register selector field of the virtual memory address, and that entry contains the virtual-page address specified within the virtual memory address, then the processor determines whether the virtual-memory page described by the virtual-memory-address can be accessed by the currently executing process. The currently executing process may access the memory page if the access rights within the TLB entry allow the memory page to be accessed by the currently executing process and if the protection key within the TLB entry can be found within the protection key registers 534 in association with an access mode that allows the currently executing process access to the memory page. The access rights contained within a TLB entry include a 3-bit access mode field that indicates one, or a combination of, read, write, and execute privileges, and a 2-bit privilege level field that specifies the privilege level needed by an accessing process. Each protection key register contains a 24-bit protection key associated with an access mode field specifying allowed read, write, and execute access modes and a valid bit indicating whether or not the protection key register is currently valid. Thus, in order to access a memory page described by a TLB entry, the accessing process needs to access the page in a manner compatible with the access mode associated with a valid protection key within the protection key registers and associated with the memory page in the TLB entry, and needs to be executing at a privilege level compatible with the privilege level associated with the memory page within the TLB entry.

If an entry is not found within the TLB with a region identifier and a virtual page address equal to the virtual page address within the virtual memory address and a region identifier selected by the region register selection field of a virtual memory address, then a TLB miss occurs and hardware may attempt to locate the correct TLB entry from an architected mapping control table, called the virtual hash page table ("VHPT"), located in kernel memory, using a hardware-provided VHPT walker. If the hardware is unable to locate the correct TLB entry from the VHPT, a TLB-miss fault occurs and a kernel or operating system is invoked in order to find the specified memory page within physical memory or, if necessary, load the specified memory page from an external device into physical memory, and then insert the proper translation as an entry into the VHPT and TLB. If, upon attempting to translate a virtual memory address to a physical memory address, the kernel or operating system does not find a valid protection key within the protection key registers 534, if the attempted access by the currently executing process is not compatible with the access mode in the TLB entry or the read/write/execute bits within the protection key in the protection key register, or if the privilege level at which the currently executing process executes is less privileged than the privilege level needed by the TLB entry, then a fault occurs that is handled by the kernel dispatching execution to operating system code.

Figure 6:
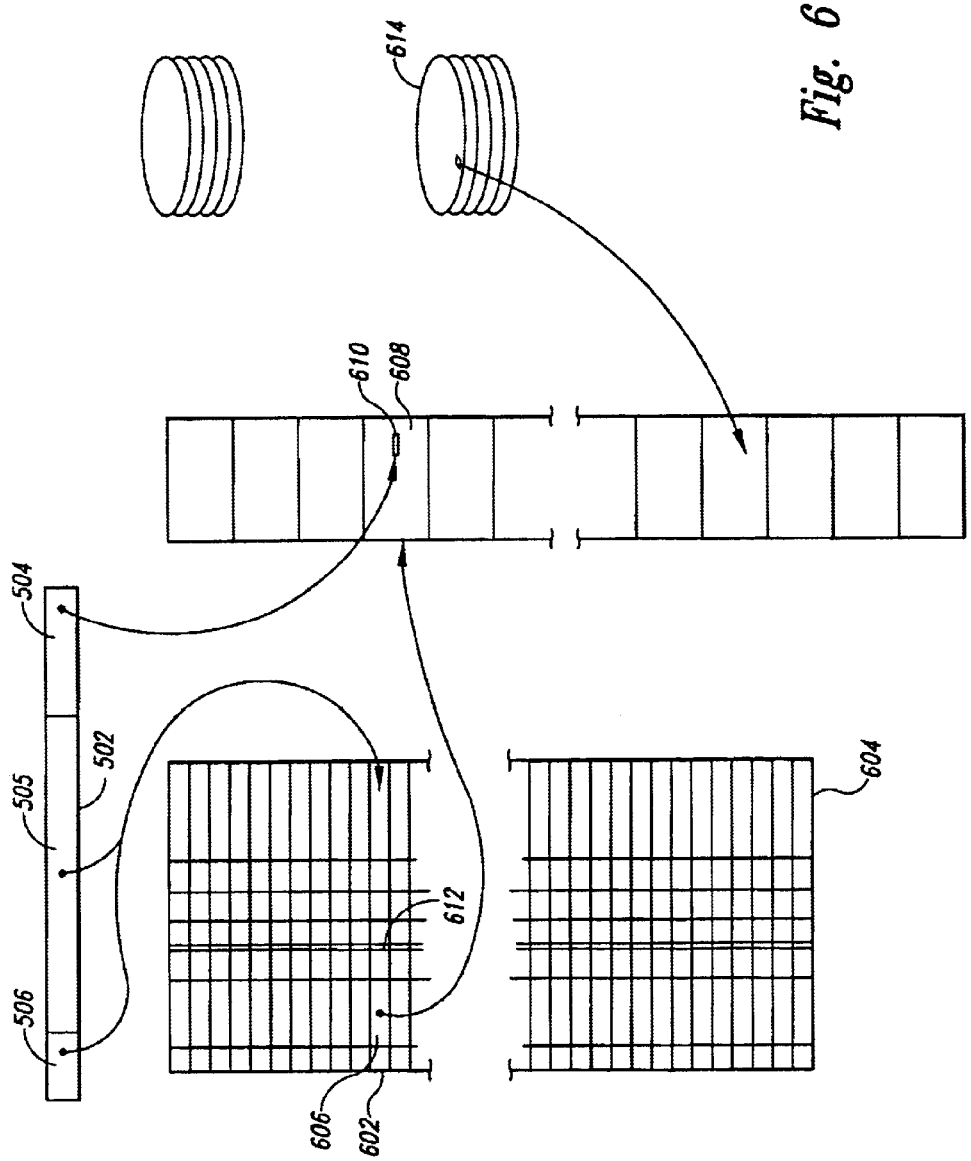
FIG. 6 shows the data structures employed by an operating system to find a memory page in physical memory corresponding to a virtual memory address.

FIG. 6 shows one form of a data structure employed by an operating system to find a memory page in physical memory corresponding to a virtual memory address. The virtual memory address 502 is shown in FIG. 6 with the same fields and numerical labels as in FIG. 5. The operating system employs the region selector field 506 and the virtual page address 505 to select an entry 602 within a virtual page table 604. The virtual page table entry 602 includes a physical page address 606 that references a page 608 in physical memory. The offset 504 of the virtual memory address is used to select the appropriate byte location 610 in the virtual memory page 608. The virtual page table 602 includes a bit field 612 indicating whether or not the physical address is valid. If the physical address is not valid, then the operating system commonly selects a memory page within physical memory to contain the memory page, and retrieves the contents of the memory page from an external storage device, such as a disk drive 614. The virtual page table entry 602 contains additional fields from which the information needed for a TLB entry can be retrieved. Once the operating system successfully maps the virtual memory address into a physical memory address, that mapping is entered into the virtual page table entry and, formatted as a TLB entry, is inserted into the TLB.

FIG. 7 shows the access rights encoding used in a TLB entry. Access rights comprise a 3-bit TLB.ar mode field 702 that specifies read, write, execute, and combination access rights, and a 2-bit TLB.pl privilege level field 704 that specifies the privilege level associated with a memory page. In FIG. 7, the access rights for each possible value contained within the TLB.ar and TLB.pl fields are shown. Note that the access rights depend on the privilege level at which a current process executes. Thus, for example, a memory page specified with a TLB entry with TLB.ar equal to 0 and TLB.pl equal to 3 can be accessed for reading by processes running at any privilege level, shown in FIG. 7 by the letter "R" in the column corresponding to each privilege level 706–709, while a memory page described by a TLB entry with TLB.ar equal to 0 and TLB.pl equal to 0 can be accessed by reading only by a process running at privilege level 0, as indicated in FIG. 7 by the letter "R" 710 under the column corresponding to privilege level 0. The access rights described in FIG. 7 nest by privilege level according to the previous discussion with reference to FIG. 4. In general, a process running at a particular privilege level may access a memory page associated with that privilege level and all less privileged privilege levels. Using only the access rights contained in a TLB entry, it is not possible to create a memory region accessible to a process running at level 3 and the kernel running at level 0, but not accessible to an operating system running at privilege level 2. Any memory page accessible to a process running at privilege level 3 is also accessible to an operating system executing at privilege level 2.

Figure 8A:
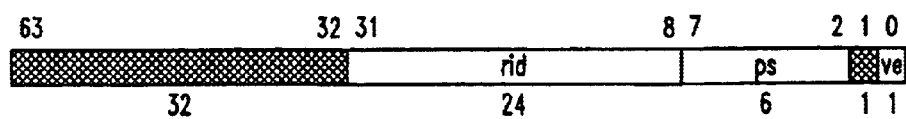
FIGS. 8A–B provide details of the contents of a region register and the contents of a VHPT long-format entry.
Figure 8B:
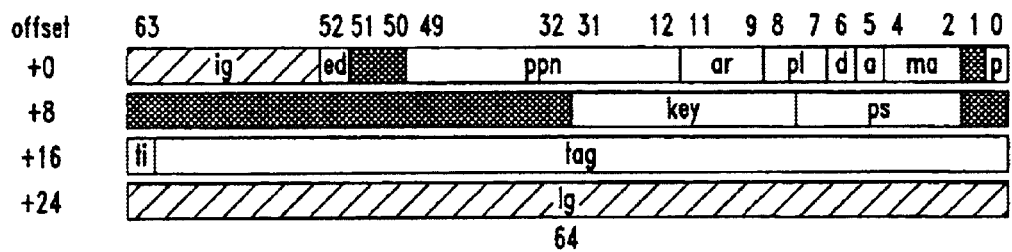

FIGS. 8A–B provide details of the contents of a region register and the contents of a VHPT long-format entry, respectively. As shown in FIG. 8A, a region register includes the following fields: (1) "ve," a 1-bit Boolean field indicating whether or not the VHPT walker is enabled; (2) "ps," a 6-bit field indicating a preferred page size for the region, where the preferred page size is $2^{ps}$; and (3) "RID," a 24-bit region identifier. A VHPT long-format entry, as shown in FIG. 8B, includes the following fields: (1) "p," a 1-bit Boolean field indicating whether or not the corresponding page is resident in physical memory; (2) "ma," a 3-bit field, called "memory attribute," which describes caching, coherency, write-policy, and speculative characteristics of the mapped physical page; (3) "a," a 1-bit field that, when zero, causes references to the corresponding page to generate access faults; (4) "d," a 1-bit Boolean field that specifies generation of dirty-bit faults upon store or semaphore references to the corresponding page; (5) "pl," a 2-bit field indicating the privilege level for the corresponding page; (6) "ar," a 3-bit access-rights field that includes the read, write, and execute permissions for the page; (7) "ppn," a 38-bit field that stores the most significant bits to the mapped physical address; (8) "ed," a 1-bit Boolean field whose value contributes to determining whether to defer a speculative load instruction; (9) "ps," a 6-bit field indicating the page size for virtual-memory mapping; (10) "key," a protection key associated with the corresponding physical page; (11) "tag," a translation tag used for hash-base searching of the VHPT; and (12) "ti," a 1-bit Boolean field indicating whether or not the translation tag is valid.

Figure 9A:
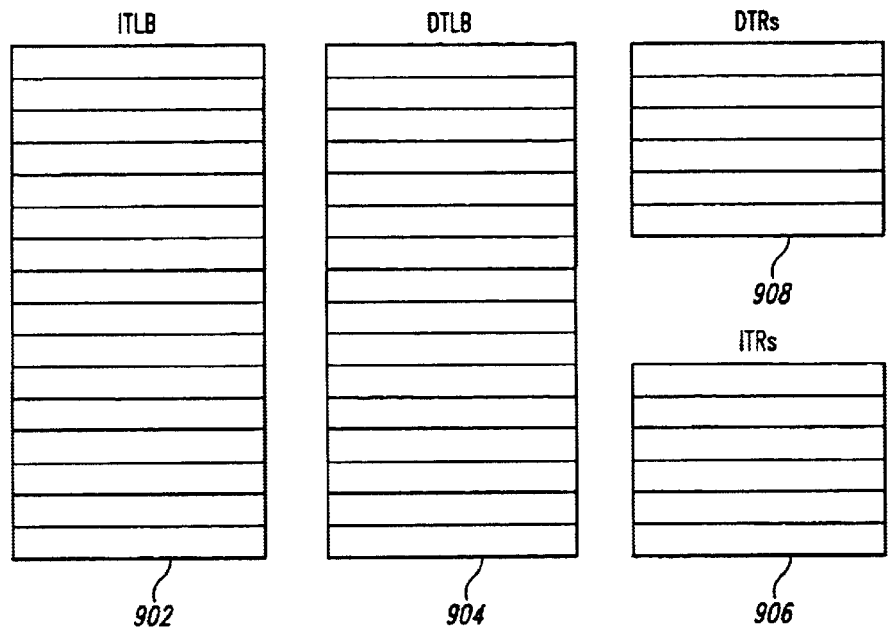
FIGS. 9A–B provide additional details about the virtual-memory-to-physical-memory translation caches and the contents of translation-cache entries.
Figure 9B:
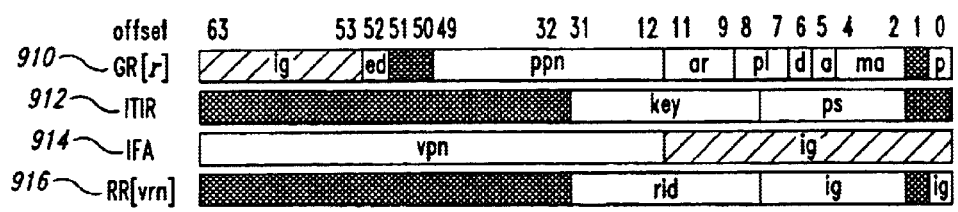

FIGS. 9A–B provide additional details about the virtual-memory-to-physical-memory translation caches and the contents of translation-cache entries. The IA-64 provides four translation caches, as shown in FIG. 9A. These include an instruction TLB ("ITLB"), a data TLB ("DTLB") 904, a set of instruction translation registers ("ITRs") 906, and a set of data translation registers ("DTRs") 908. The four translation caches are together referred to as the "TLB." Entries are placed into the ITLB, DTLB, ITRs, and DTRs by using the privileged instructions itc.i, itc.d, itr.i, and itr.d, respectively. As discussed above, the ITLB and DTLB serve as a first cache for virtual-memory-to-physical-memory translations. The ITRs and DTRs serve to pin virtual-memory pages in the physical memory. In other words, the physical page corresponding to a virtual-memory page represented by an entry in an ITR or DTR register is fixed in physical memory, and cannot be paged out, during execution of a process employing a virtual-memory address space that includes the virtual-memory page.

FIG. 9B shows the contents of registers used to insert translation-cache entries into the translation caches using the above-described privileged instructions. The contents of four different registers are employed: (1) a general register 910 specified as an operand to the privileged instruction, the interruption TLB insertion register ("ITIR") 912, the interruption faulting address register ("IFA") 914, and the contents of the region register 916 selected by the most significant 3 bits of the IFA register 914. Many of the fields shown in FIG. 9B are identical to the fields in the VHPT long-format entry, shown in FIG. 8B, and are not again described, in the interest of brevity. The field "vpn" in the IFA register contains the most significant bits of a virtual-memory address. In both a VHPT entry and a translation-cache entry, the most significant bits of a physical page address and virtual-memory-page address represent the address of a first byte of a physical page and virtual-memory page, respectively. Thus, VHPT entries and TLB entries are referred to as corresponding both to virtual-memory addresses and to virtual-memory pages. The unspecified, least-significant bits of a physical-memory address or virtual-memory address an offset, in bytes, of a byte within the physical memory or virtual memory page specified by the most significant bits.

Techniques of One Embodiment of the Present Invention

One embodiment of the present invention comprises an overall memory-management scheme and a collection of memory-management mechanisms that allow the monitor (202 in FIG. 2) to provide to each guest operating system (220 and 222 in FIG. 2) separate guest-virtual-memory address spaces (224 and 226 in FIG. 2). In the embodiment described below, the memory-management scheme and memory-management mechanisms are tailored to, and implemented using, intel® IA-64 architecture features. However, the general approach to guest virtual-memory address-space management represented by this scheme and these techniques are applicable to other modern processor architectures that provide features similar to those provided by the Intel® IA-64 architecture. Much of the first part of the following discussion concerns partitioning of system resources related to memory management between the monitor and guest operating systems. Later, a description of the memory management process is provided. Finally, an implementation of monitor-based memory-management using the described partitions and techniques is provided in Appendix A.

As discussed above, with reference to FIGS. 4 and 5, the IA-64 architecture provides, in many implementations, an 85-bit virtual-memory address space, logically divided into regions, each identified by a region ID contained in the top 24 bits of a 85-bit virtual-memory address. This 85-bit virtual-memory address space is provided by the IA-64 architecture to the monitor, which then further partitions the full virtual-memory address space into smaller, guest virtual-memory address spaces that the monitor provides to guest operating systems. The monitor provides a smaller guest-virtual-memory address space to each guest operating system, and partitions the full 85-bit processor-provided virtual-memory address space in order to minimize the overhead of context switching between guest operating systems.

Figure 4:
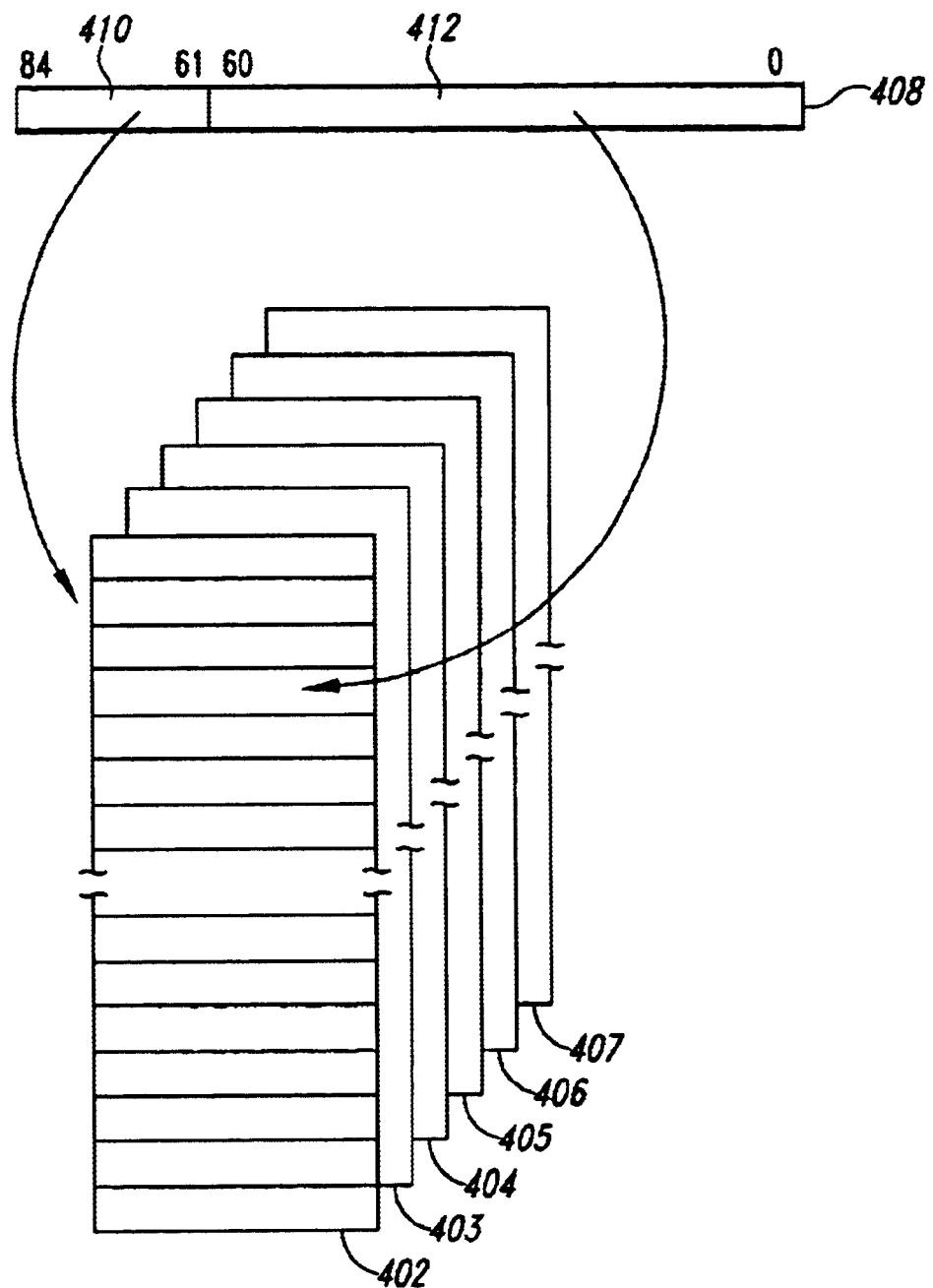
FIG. 4 illustrates the virtual address space provided by one modem computer architecture.
Figure 10A:
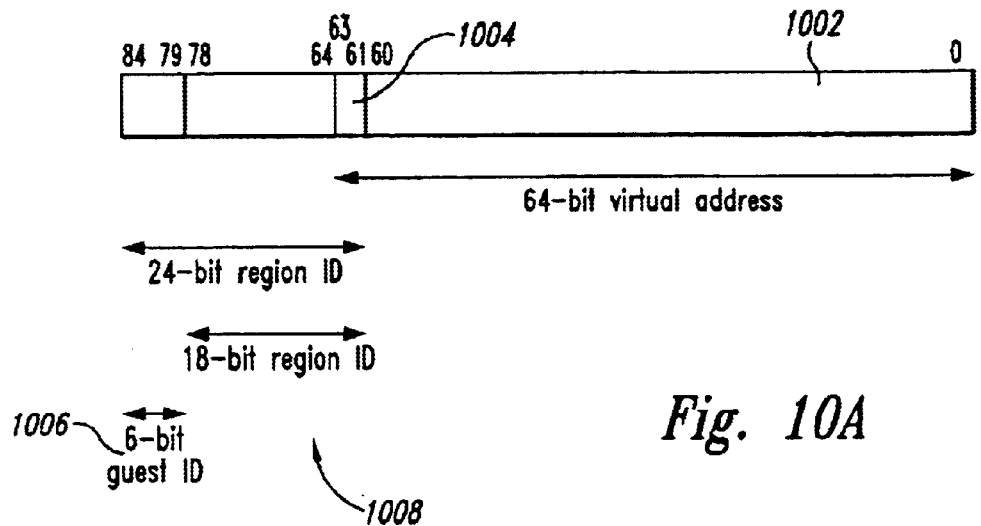
FIG. 10A illustrates partitioning, by a monitor, of a processor-provided 85-bit virtual-memory address into fields used to provide a 79-bit guest virtual-memory address space to each guest in one embodiment of the present invention.

FIG. 10A illustrates partitioning, by a monitor, of a processor-provided 85-bit virtual-memory address into fields used to provide a 79-bit guest virtual-memory address space to each guest in one embodiment of the present invention. In FIG. 10A, an 85-bit, processor-provided virtual-memory address 1002 is represented in the fashion of FIG. 4. As discussed above with reference to FIG. 4, the processor-provided virtual-memory address space is partitioned into $2^{24}$ regions, each region comprising a 64-bit virtual-memory address space. The top 3 bits 1004 of a 64-bit virtual address space select one of eight region registers that each contains a 24-bit region ID that selects a particular region. Thus, each $2^{64}$ consecutive virtual-memory addresses are spread among $2^3$, or eight, consecutive regions.

In the described embodiment, the monitor intercepts guest-operating-system inquiries to the firmware layer regarding the number of regions supported by the underlying processor. Instead of reporting to the guest operating systems the actual number of regions that are provided, the monitor instead reports that only $2^{18}$ regions are supported. In other words, from the standpoint of the guest operating systems, region IDs consist of 18 bits. In the case that the processor supports full 24-bit region registers, the monitor uses the top 6 bits of each 24-bit region identifier for its own purposes. In the described embodiment, the top 6 bits designate guest identifiers, or guest IDs, each guest ID unique to a particular guest operating system. In the described embodiment, the monitor reserves the 6-bit guest ID "0x3F" as a special monitor ID, and reserves the 6-bit guest ID "0" for a special guest operating system referred to as the special partition ("SPAR"). Thus, in the described embodiment, the monitor can provide a 79-bit guest-virtual-memory address space to each of $2^6-2=62$ different concurrent guest operating systems, as well as to the SPAR and to the monitor. In summary, the monitor views a 85-bit virtual-memory address provided by the underlying machine architecture as comprising a 6-bit guest ID 1006, an 18-bit region ID 1008 specifying a particular region within a 79-bit guest-virtual-memory address space, and a 61-bit byte offset into the specified region.

One advantage of the above-described partitioning of memory is that virtual-memory addresses within one 79-bit guest-virtual-memory address space do not overlap any other 79-bit guest-virtual-memory address space. Therefore, the monitor need not flush the TLB during a context switch between concurrently running guest operating systems, and can rely instead on the normal TLB-entry replacement mechanisms invoked by the hardware upon TLB misses.

Figure 10B:
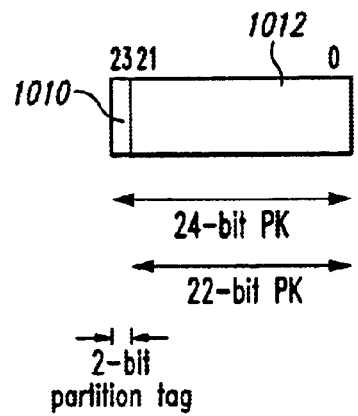
FIG. 10B illustrates partitioning of the protection-key space by a monitor in one embodiment of the present invention.

FIG. 10B illustrates partitioning of the protection-key space by the monitor in one embodiment of the present invention. In the described embodiment, the memory-management scheme, employed by the monitor and consistent with the partitioning of virtual-memory address space, described above with respect to FIG. 10A, relies on requisition by the monitor of a portion of the available protection keys for the monitor's exclusive use. In order to obtain exclusive use of a number of protection keys, the monitor partitions the protection-key space provided by the underlying machine architecture. FIG. 10B illustrates the nature of the protection-key space partitioning by the monitor. The monitor essentially provides 22-bit protection keys, rather than 24-bit protection keys provided by many IA-64 processors, to the guest operating systems. As shown in FIG. 10B, the monitor employs the top two bits 1010 of a 24-bit protection key 1012 as a 2-bit protection-key-space partition tag. When the two bits of the 2-bit protection-key-space partition tag are both zero, the 24-bit protection key corresponds to a 22-bit guest protection key. When either or both bits of the 2-bit protection-key-space partition tag are non-zero, the 24-bit protection key is reserved for exclusive use by the monitor.

Figure 11:
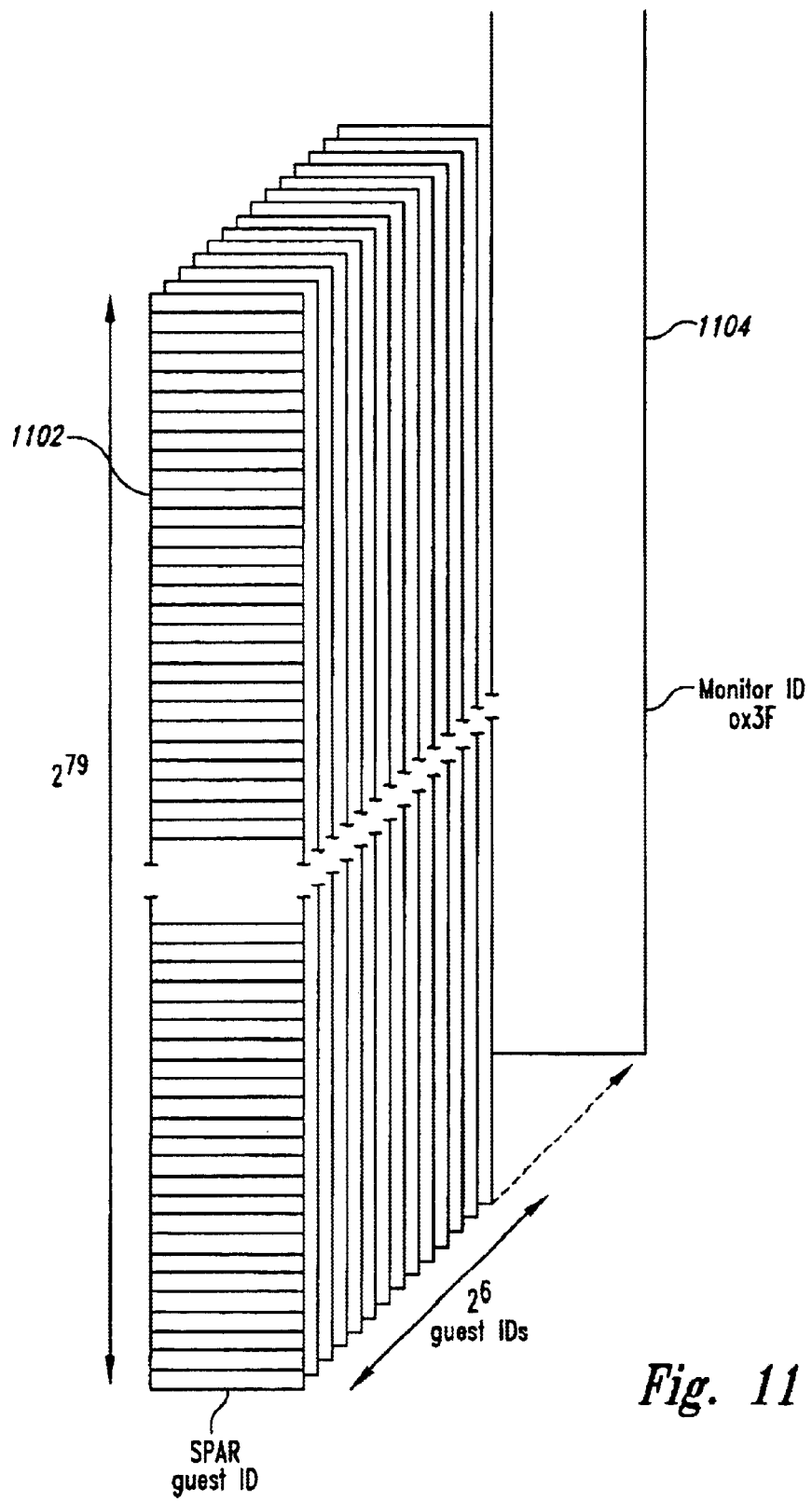
FIG. 11 illustrates the partitioning of the 85-bit processor-supplied virtual-memory address space visible to a monitor into 64 79-bit guest-virtual-memory address spaces in one embodiment of the present invention.

FIG. 11 illustrates partitioning of the 85-bit processor-supplied virtual-memory address space visible to the monitor into 64 79-bit guest-virtual-memory address spaces in one embodiment of the present invention. As shown in FIG. 11, each 79-bit guest-virtual-memory address space, such as guest-virtual-memory address space 1102, comprises $2^{79}$ bytes of consecutively addressed virtual memory. The first 79-bit guest-virtual-memory address space is reserved for the SPAR, and the final 79-bit virtual-memory address space, having a guest ID value (1006 in FIG. 10A) of 0x3F, is reserved for the monitor 1104.

Figure 12:
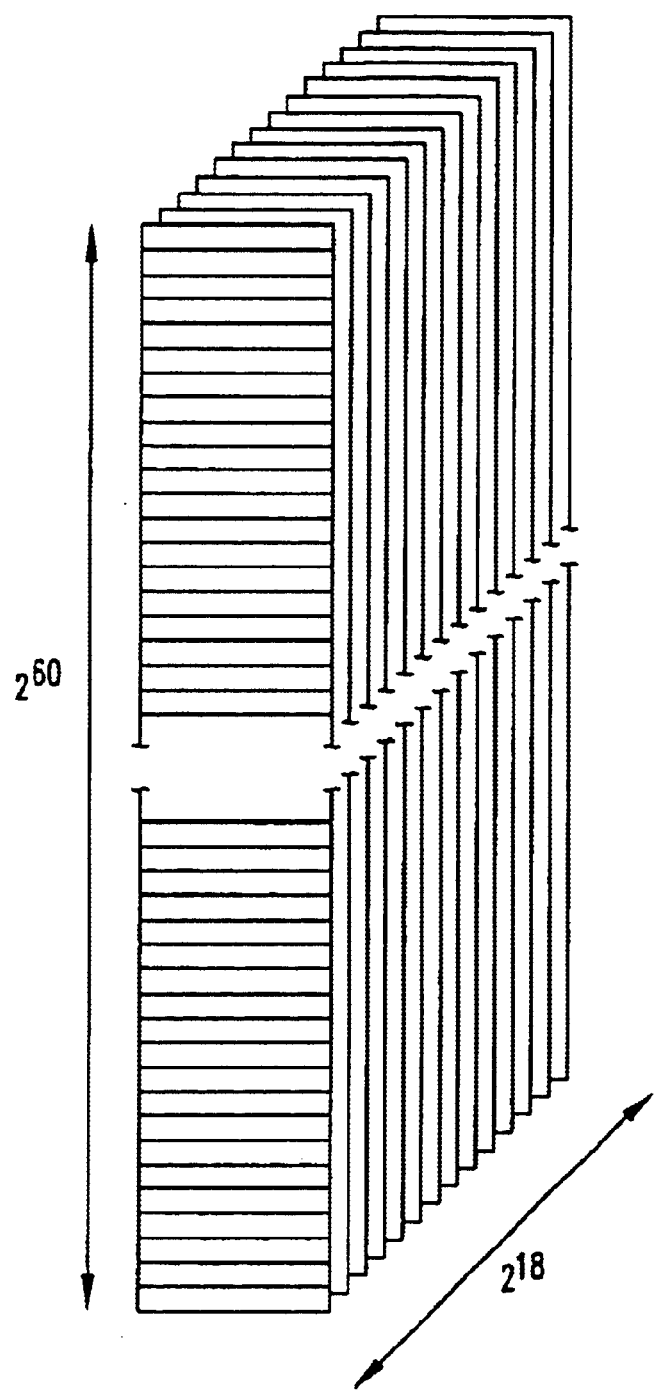
FIG. 12 illustrates partitioning of a guest-virtual-memory address space into regions in one embodiment of the present invention.
Figure 13:
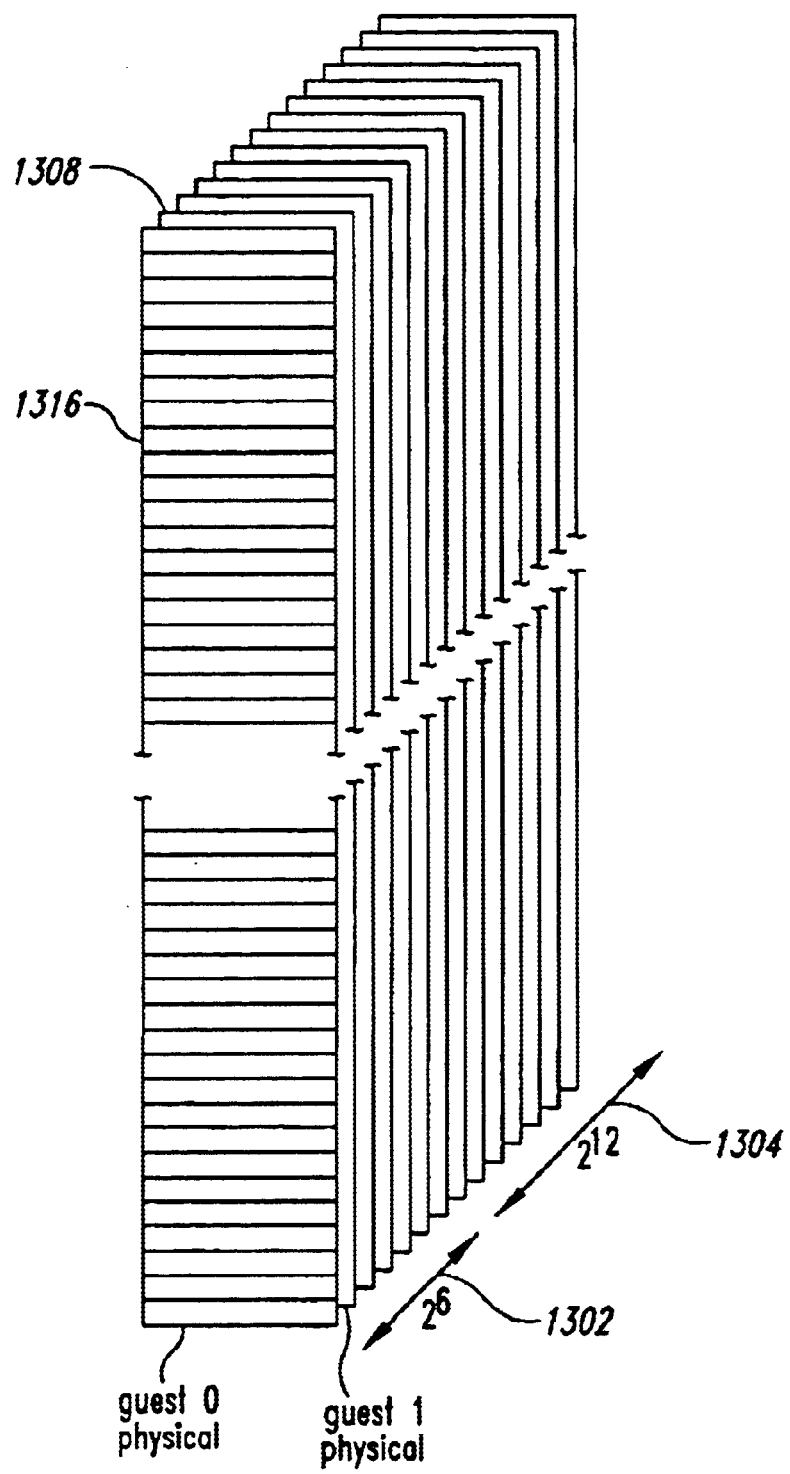
FIG. 13 illustrates the 79-bit virtual-memory address space reserved for the monitor in one embodiment of the present invention.

FIG. 12 illustrates partitioning of a guest-virtual-memory address space into regions in one embodiment of the present invention. As shown in FIG. 12, a guest-virtual-memory address space can be thought of as $2^{18}$ regions, each region comprising $2^{60}$ consecutively addressed bytes. FIG. 13 illustrates the 79-bit virtual-memory address space reserved for the monitor in one embodiment of the present invention. The monitor further partitions its own virtual-memory address space into $2^6$ guest physical regions 1302 and $2^{12}$ regions 1304 available to the monitor for other uses. The monitor thus reserves one $2^{60}$-byte region for representing the physical memory for each guest operating system, including the SPAR. The first region 1306 in the monitor's 79-bit virtual-memory address space is reserved as the guest physical memory for the SPAR. The second region 1308 is represents the guest physical memory for the guest operating system having guest ID 1, with each successive region representing the guest physical memory for guest operating system with successive guest IDs.

The monitor needs to initially handle all interruptions generated at run time, although the monitor may often pass through interruptions to guest operating systems. In addition, the monitor needs to maintain certain memory-resident information corresponding to the states of the currently running guest operating systems across guess-operating-systems context switches. Thus, the monitor needs a convenient portion of host virtual memory for its own purposes, and must pin, or ensure mapping, of the monitor's interrupt vector table and the guest-operating-system state information. In the described embodiment, the monitor reserves for its exclusive use certain portions of the region specified by the contents of the region register 7. In other words, whatever region is currently described by region register 7 must include virtual-memory address space allocated for the monitor. Region register 7 is selected because a number of operating systems map a region of virtual memory via region register 7 as part of an initialization process and tend to subsequently maintain that mapping. Moreover, these operating systems generally use only a portion of the region-7 virtual-memory address space.

FIG. 14 illustrates the contents of region 7 in one embodiment of the present invention. Region 7 begins with the 64-bit virtual-memory address 0xE000000000000000 and ends with 64-bit virtual-memory address 0xFFFFFFFFFFFFFFFF. In FIG. 14, the lowest region-7 virtual-memory address 1402 is obtained when the 3-bit region-register-selection field contains the value 0x7 and the remaining bits of the 64-bit virtual-memory address are zero, and the highest region-7 64-bit virtual-memory address 1404 is obtained when the 3-bit region-register selection field contains the value 0x7 and the remaining bits of the 64-bit virtual memory address have the value 1. As shown in FIG. 14, the region 7 virtual-memory address space includes 7 discrete subregions used by the monitor 1406–1412, with the remaining subregions 1414–1420 used by the currently active guest operating system.

Figure 15:
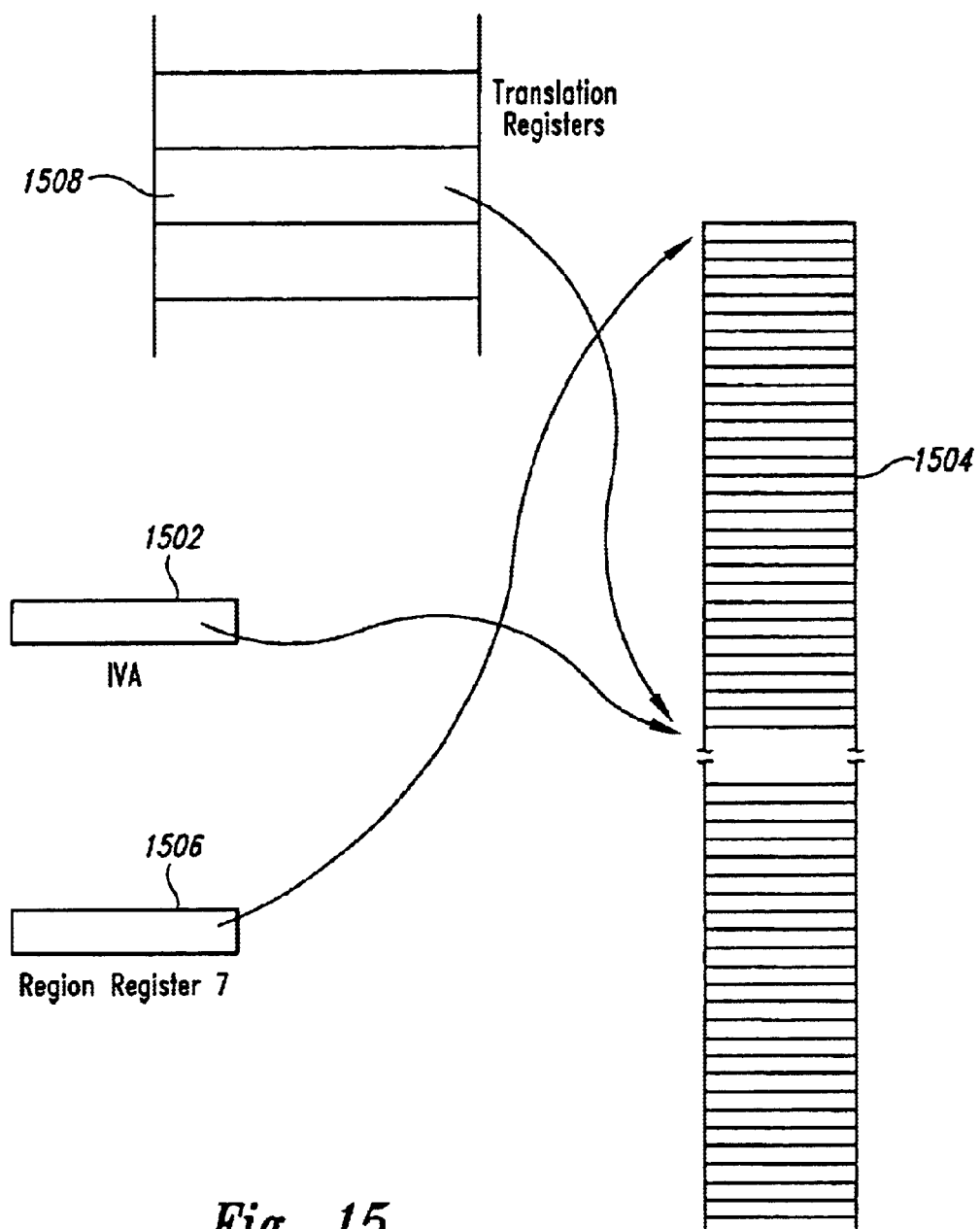
FIG. 15 graphically illustrates pinning of the monitor's interrupt vector table in one embodiment of the present invention.

FIG. 15 illustrates pinning of the monitor's interrupt vector table in one embodiment of the present invention. As discussed above, the monitor reserves space within the virtual-memory address-space regions specified by the contents of region register 7 for its own use. In a portion of this reserved space, the monitor initializes and maintains system interrupt vector tables through which interruptions are directed to interruption-handling routines. The contents of the system IVA register 1502 contain a virtual-memory reference to the start of the system IVT. Note that the monitor must control the contents of the system IVA register so that the monitor's IVT is employed by the processor for directing interruptions to interrupt-handling routines, regardless of which guest operating system is currently running. The monitor may track virtual IVTs for each guest operating system in order to emulate guest-operating-system specific interruption handling, as necessary. The monitor's IVT is contained within the virtual-memory-address-space region 1504 specified by the contents of system region register 7 1506. The monitor ensures that the IVT is pinned, or constantly mapped, by maintaining a virtual-memory-translation entry 1508 for the beginning of the IVT in the translation registers.

The monitor represents a virtualization of machine resources in order to facilitate efficient execution of multiple operating systems on a computer system based on one or more modern processors. Because the monitor provides a virtual hardware layer to each guest operating system, operating systems do not need to be ported to the computer system. A guest operating system is unaware of the monitor interposed between the guest operating system and the underlying computer system, and is commonly unaware of other guest operating systems concurrently executing on the computer system. In the described embodiment, the guest operating system operates as if it were directly running on physical hardware. The guest operating system generally employs virtual-machine architectural support for managing virtual memory, including translating virtual-memory addresses to host physical-memory address and for mapping virtual-memory pages to physical memory within the computer system. The monitor allows the guest operating system to manage virtual memory exactly as if the guest operating system were directly executing at the hardware and firmware level of the computer system. However, what the guest operating system considers to be host physical addresses are actually virtual physical addresses, or guest physical addresses that are mapped by the monitor and SPAR to true host physical address space. The monitor maintains a cache of guest-physical-address to host-physical-address translations, and relies on the SPAR to maintain a complete mapping of guest physical addresses to host physical address for all concurrently executing guest operating systems.

FIG. 16 illustrates mapping of guest physical-address space to host physical-address space in one embodiment of the present invention. As shown in FIG. 16, a guest operating system views physical memory as a set of contiguously addressed bytes ranging from byte 0 1602 up to MAXMEM 1604, where the guest operating system obtains MAXMEM via a call to a firmware routine that is intercepted by the monitor. Most of what the guest operating system considers physical memory is mapped, by the monitor and SPAR, to actual host physical memory, as indicated by the arrows in FIG. 16, such as arrow 606. There are, however, several discrete regions of physical memory, including the SIM VGA space 1608 and the simulated Mem-mapped I/O space 1610, access to which by guest operating systems needs be tracked by the monitor and emulated. These regions of physical memory are normally mapped by the system to special registers and to special bus addresses that allow a processor to intercommunicate with external devices.

The monitor maintains control over the physical hardware by running at privilege level 0, the most privileged privilege level of the machine, and arranging for all other processes, including guest operating systems, to run at privilege level 1 or less privileged privilege levels. Guest operating systems are written to run at privilege level 0. Thus, in order to maintain control, and to provide guest operating systems with the illusion that they are running at the most privileged privilege level, the monitor intercepts all attempts by the guest operating system to execute privileged instructions, including instructions that modify the current privilege level by modifying the PSR register, including a combination of writing a desired priority level in the IPSR register and then returning by executing a rfi instruction or via an epc instruction. FIG. 17 illustrates partitioning of privilege levels by the monitor in one embodiment of the present invention. As shown in FIG. 17A, bits 32 and 33 1702 of the system PSR register 1704 indicate the current privilege level for the currently executing program. As shown in FIG. 17B, the monitor reserves privilege level 0, the most privileged privilege level, for its own, exclusive use. The monitor arranges for guest operating systems to run at privilege level 1 and the guest operating systems, in turn, generally relegate application programs and other processes to run at less privileged privilege levels PL2 and PL3.

Figure 18:
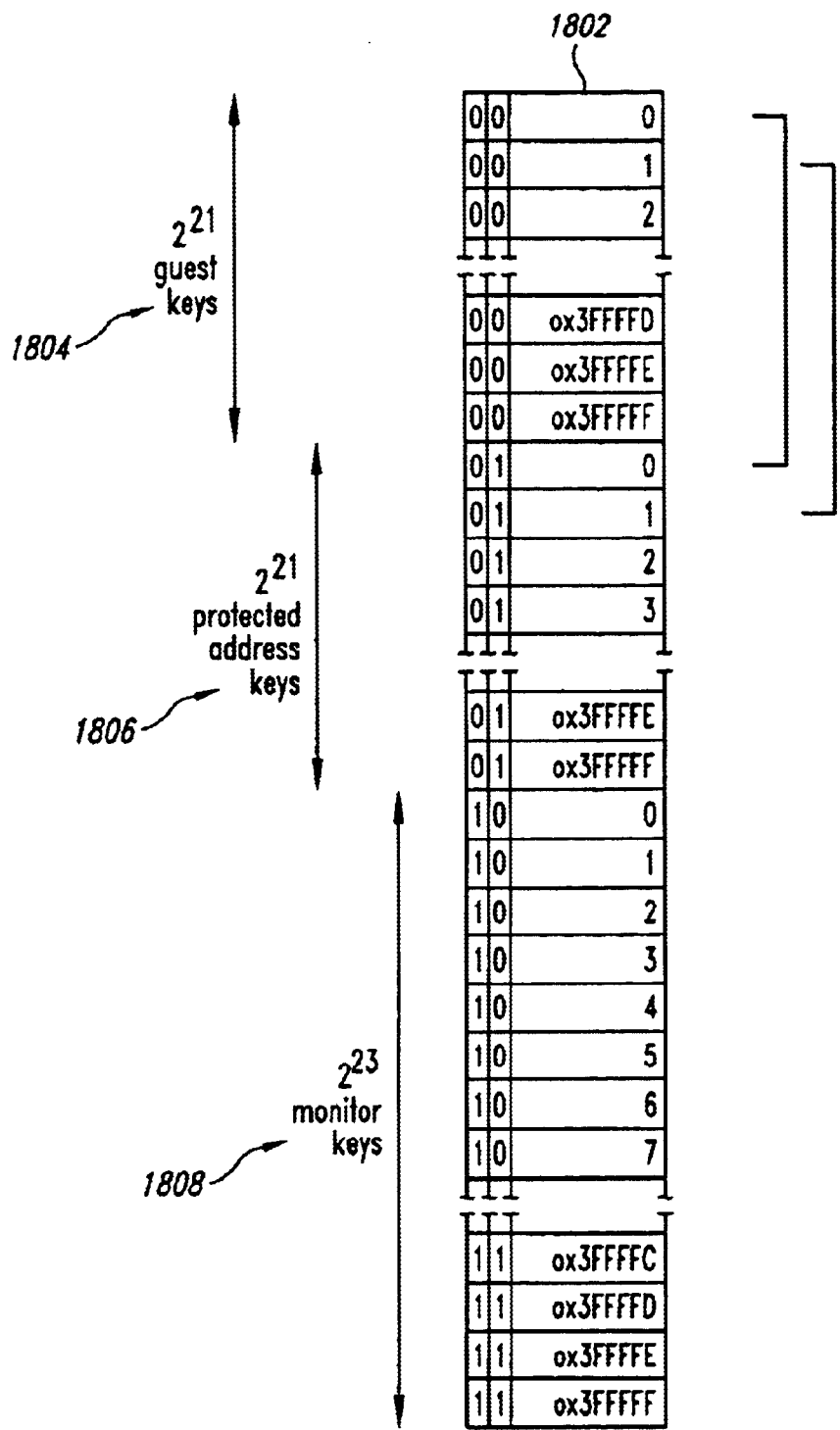
FIG. 18 illustrates partitioning of the protection-key space by the monitor in one embodiment of the present invention.

As discussed previously, with reference to FIG. 10B, the monitor partitions the protection-key space provided by the 24-bit protection key, into a 22-bit guest protection-key space and three other 22-bit protection-key spaces. FIG. 18 illustrates partitioning of the protection-key space by the monitor in one embodiment of the present invention. As discussed with reference to FIG. 10B, the monitor reserves the upper two bits 1802 of each 24-bit protection-key for its own use. These 2-bits constitute a protection-key-space partition tag. When the protection-key-space partition tag has the value 0, the 24-bit protection-key represents a guest-operating-system protection-key. Thus, the monitor allocates $2^{21}$ protection-keys, all with the most significant 2 bits having the value 0, for use by guest operating systems. As is discussed below, the monitor modifies the protection-keys assigned by guest operating systems to physical memory pages in order to intercept access to those physical memory pages. The monitor therefore reserves a mirror set of $2^{21}$ protection keys for replacing guest-operating-system protection-keys in order to track access to particular virtual-memory pages. The mirror set of protections keys has a protection-key-space partition-tag value of 0x01. In other words, the monitor modifies the protection-key assigned by a guest operating system to a virtual-memory page by toggling bit 22 of the guest-operating-system-assigned protection key in order to generate a mirror protection key reserved for exclusive use by the monitor. Using this scheme, the monitor can recognize virtual-memory pages protected from access by the guest operating systems and can readily return these virtual-memory pages to a state in which they can be accessed by the guest operating systems by toggling bit 22 back to the value 0. Finally, the monitor reserves, for its exclusive use, those protection keys in which the protection-key-space partition tag has the value 2 or 3. As shown in FIG. 18, the first 25% of the protection-key space 1804 is allocated to guest operating systems. The second 25% of the protection-key space 1806 is allocated to the monitor to allow the monitor to inhibit direct access to virtual-memory pages by guest operating systems, and the next 50% of the protection-key space 1808 is allocated for exclusive use by the monitor.

Figure 19A:
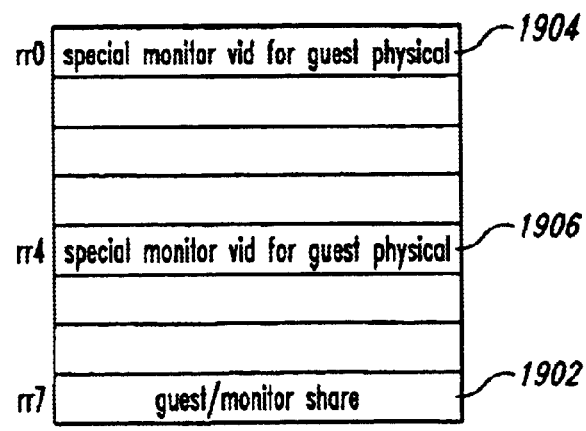
FIGS. 19A–19B show other system resources, direct access to which the monitor reserves exclusive use, in one embodiment of the present invention.
Figure 19B:
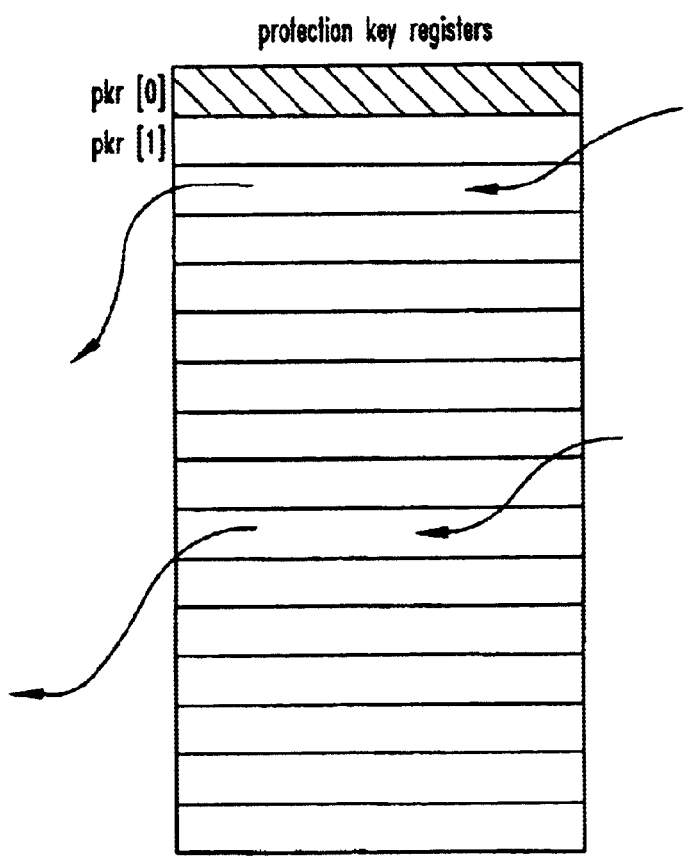

As shown in FIGS. 19A–19B, the monitor exclusively uses or borrows other system resources unbeknownst to guest operating systems, in one embodiment of the present invention. As shown in FIG. 19A, and as previously discussed, both the monitor and currently executing guest operating system share region register 7 1902. In addition, whenever the guest operating system executes instructions intercepted by the monitor, to turn off virtual-memory-address translation and to therefore directly access physical memory, the monitor overrides the contents of a particular region register, in many cases, region register 0, with a special monitor region identifier identifying the region within the monitor virtual-memory address space corresponding to guest physical memory. In addition, when the guest operating system sets the top bit of a 64-bit guest physical memory address to indicate uncacheable access, the monitor also writes the monitor region identifier corresponding to the guest physical memory into region register 4 1906, since the monitor does not support uncacheable access, and setting the top bit of a 64-bit physical memory address results in access to the region specified by the contents of region register 4. Note that it is common for guest operating systems to map physical memory to the region specified by the contents of region register 0, but that, when a guest operating system does not employ region register 0 in this way, the monitor may elect to use another region register for guest physical memory. As shown in FIG. 19B, the monitor also may use certain of the protection-key registers for its own uses. A number of operating systems use protection-key register 0 to contain a protection-key by which they protect their IVT and VHPT. Because they generally set this protection-key register at boot time, and do not again change it, the monitor may use this protection key register to contain the protection-key by which the monitor protects its own VHPT and IVT. Alternatively, the monitor may choose to use another protection-key register for this purpose. In addition, the monitor may need to, from time-to-time, borrow at most two protection-key registers in order to allow for access to virtual-memory pages protected by monitor protection-keys. When the guest operating system accesses guest physical addresses, the monitor turns off the hardware VHPT walker so that the accesses can be intercepted via alternate TLB handlers.

Figure 20:
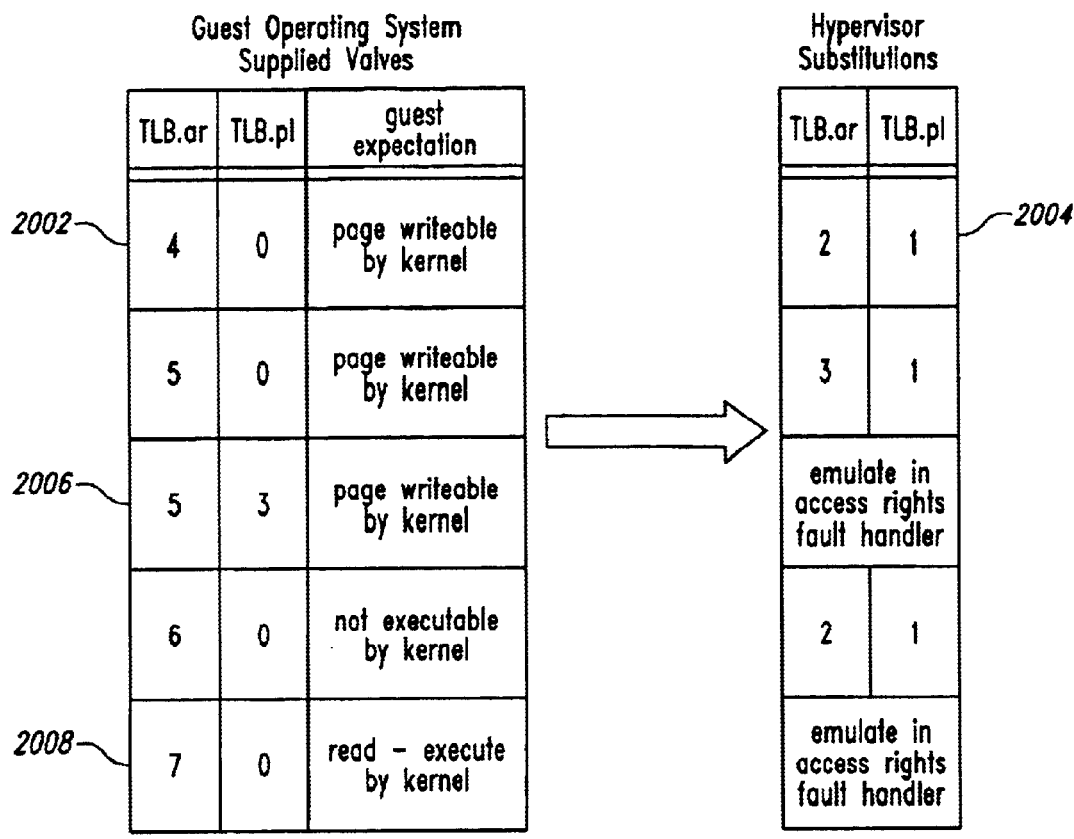
FIG. 20 shows the access-rights and priority-level value combinations that, when specified by a guest operating system, need to be changed to different values by the monitor in one embodiment of the present invention.

Because the monitor reserves exclusive use of priority level 0 for its own purposes, the monitor must take care to handle circumstances in which a guest operating system, running at priority level 1 but assuming that it is running at the most privileged privilege level, encounters unexpected machine states. Such circumstances can arise from the page-level access rights and priority-level values assigned to a page, as discussed with reference to FIG. 7. As previously discussed, the value of the access-rights field "TLB.ar" is combined with the value of the priority level field "TLB.pl" to determine the access rights for a process running at a particular priority level. Consider a case where a guest operating system, assuming that it is running at priority level 0, assigns an access-rights field value of "4" to a page. As can be seen in the table shown in FIG. 7, the guest operating system would assume that it had both READ and WRITE access to that page, since the guest operating system assumes that it is running at priority level 0. However the guest operating system actually executes at hardware priority level 1, with the monitor running at greater priority in order to manage interrupts, virtual-memory addressing and other features of the computer system. If the monitor simply intercepted the assignment of access rights by the guest operating system to a page and substituted the value "1" for priority level in place of the guest-operating-system-supplied value of "0," then the guest operating system would have READ-only access to the page, and not READ/WRITE access. Therefore, the monitor must choose an access-rights and priority-level value combination that provides to the guest operating system the access at priority level 1 that the guest operating system designated at its assumed priority level of 0. In the case of the access-rights value "4" and priority level "0," the monitor chooses the substitute values "2" and "1," with can be seen, by inspection of the corresponding cells in the table shown in FIG. 7, to provide READ/WRITE access to the guest operating system running at priority level 1. FIG. 20 shows the access-rights and priority-level value combinations that, when specified by a guest operating system, need to be changed to different values by the monitor in one embodiment of the present invention. For example, as discussed above, the values "4" and "0" 2002 are replaced by the monitor with the values "2" and "1" 2004. In two cases 2006 and 2008, rather than simply substituting values for the guest-operating-system-supplied values, the monitor needs to emulate the access rights specified by the guest operating system and supply the values by intercepting guest-operating-system access to a page via an access-rights fault handler and carry out the load or store operation that caused the access-rights fault on behalf of the guest operating system.

Figure 21:
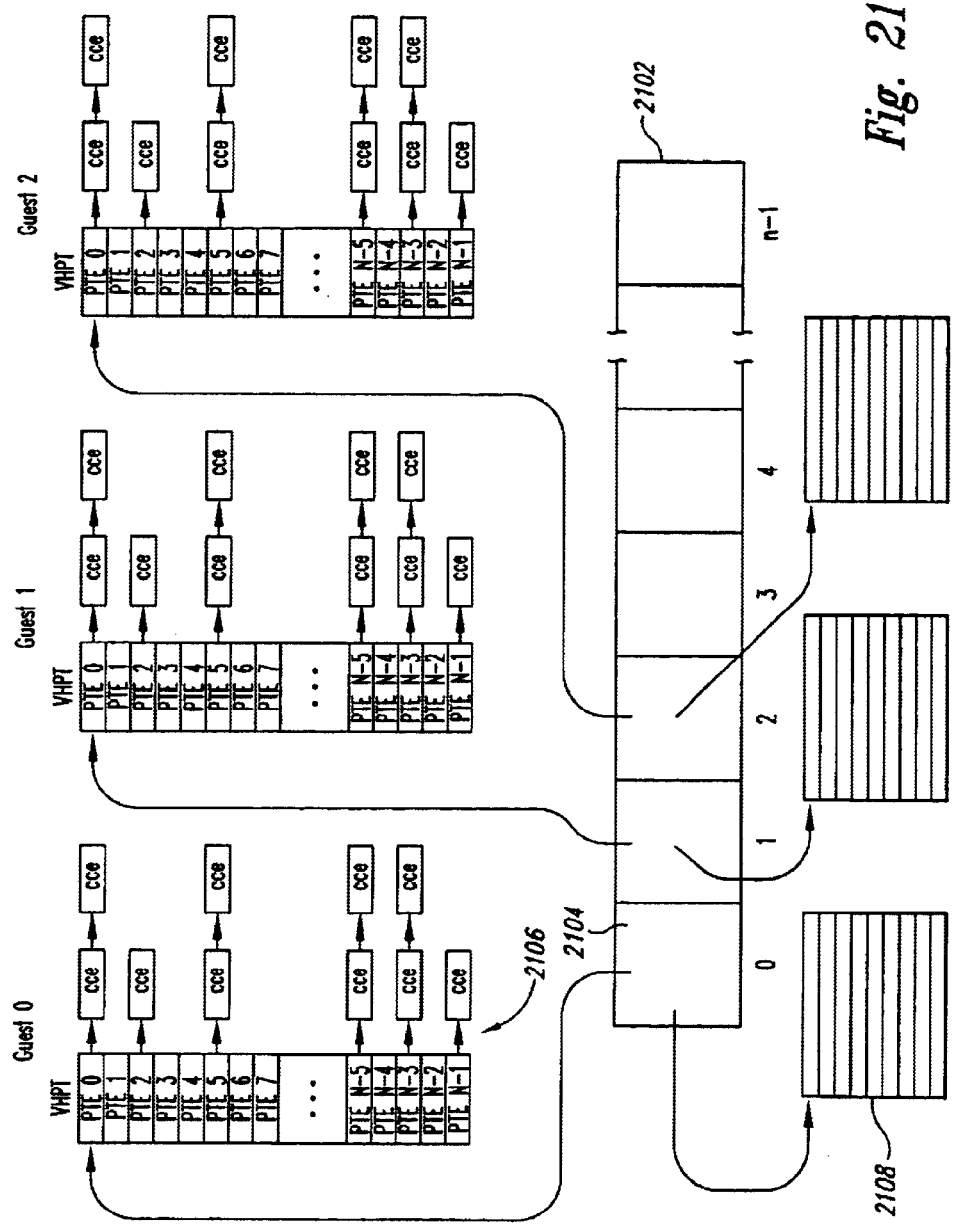
FIG. 21 illustrates state information maintained by the monitor related to virtual-memory addressing in one embodiment of the present invention.

The monitor needs to maintain state information for each concurrently executing guest operating system in order to context switch between guest operating systems so that the monitor can provide the illusion to each guest operating system that it is running directly above the machine level, independently of any other concurrently executing guest operating systems and independently of the monitor. FIG. 21 illustrates state information maintained by the monitor related to virtual-memory addressing in one embodiment of the present invention. As shown in FIG. 21, the monitor maintains, in the virtual-memory-address-space region specified by the contents of the region register 7, an array 2102 of structures, such as structure 2104, each containing the context information for a particular guest operating system. The structure contains the guest operating system's version of the PTA register, which references the guest operating system's virtual VHPT, also stored in the virtual-memory-address-space region specified by the contents of region register 7. The guest operating system's virtual VHPT is virtual in that it is searched by the monitor, on behalf of the guest operating system, rather than by the hardware walker. The monitor maintains a monitor VHPT that is searched by the hardware walker, the address of which is stored in the physical PTA register. The structure also contains a reference to a guest virtual TLB, such as virtual TLB 2108. Thus, on a context switch, the monitor needs to update a pointer that references the current guest-operating-system context to reference the appropriate structure within the array of structures 2102 for the incoming guest operating system. In addition, on a context switch, the monitor must update the region registers and protection-key registers to reflect the values saved in the context structure when the incoming guest operating system was last context-switched out, and must also overwrite the translation registers containing pointers to region-7 monitor data in order to properly pin the monitor-exclusive memory regions within the virtual-memory-address-space region now specified by the contents of region register 7. Finally, the monitor restores any other registers to the values they had at the point that the incoming guest operating system was last context-switched out.

Figure 22:
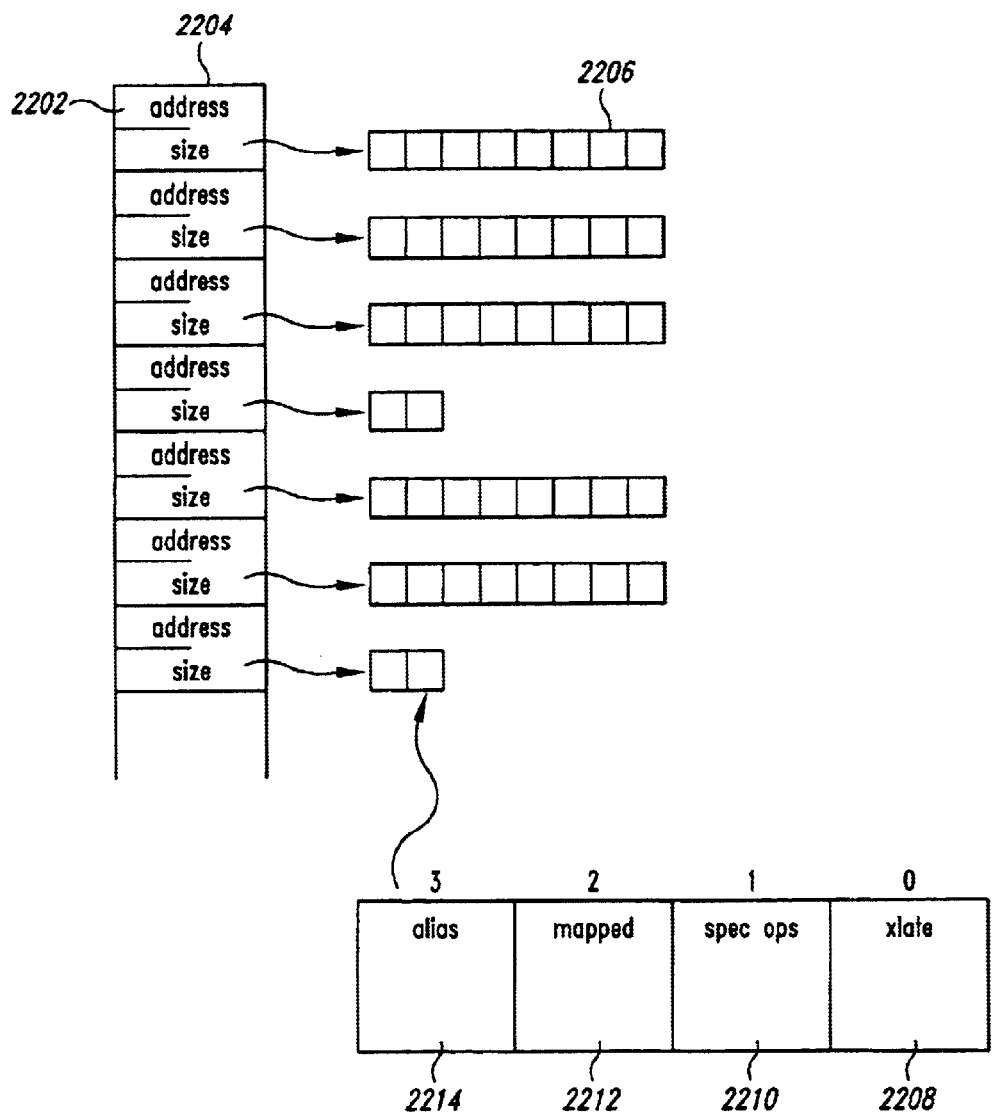
FIG. 22 illustrates a physical-memory-flag data structure employed by the monitor to track guest-operating-system-specified physical pages containing kernel text in one embodiment of the present invention.

The monitor needs to keep track of physical memory that can be executed as kernel text by a guest operating system to ensure that any pages that have been modified, as will be discussed below, are protected by protection-keys allocated for the exclusive use of the monitor. When a guest operating system executes privileged instructions to insert translations into the TLB for physical pages, the monitor creates a corresponding physical memory flag, or set of physical memory flags, to track each 4K physical page specified by the guest operating system as executable at the highest privilege level or, in other words, as kernel executable code or kernel text. For example, if the guest operating system employs 16K pages, then the monitor needs to allocate an array of 4 sets of physical memory flags for each 4K physical page within the 16k page specified by the guest operating system. FIG. 22 illustrates a possible physical-memory-flag data structure employed by the monitor to track guest-operating-system-specified physical pages containing kernel text in one embodiment of the present invention. In the data structure shown in FIG. 22, the beginning address of, and size of, each set of contiguous physical pages specified by a guest operating system are included in each cell, such as cell 2202, of an array 2204 of physical addresses. For each physical address of a page containing guest-operating-system-kernel executable code, the monitor allocates an array of 4-bit physical memory flags, such as array 2206 containing 8 4-bit physical memory flags. In the example of array 2206, the corresponding guest operating system employs 32K pages, requiring the monitor to track 8 contiguous 4K physical pages using the 8 4-bit physical memory flags in the allocated array 2206. The 4-bit physical memory flags include the following 4 1-bit flags: (1) "xlate" 2208, indicating whether or not the page has been modified; (2) "specOps" 2210, indicating that the page contains one or more thash, ttag, or cover suspect instructions; (3) "mapped" 2212, indicating that the page has been executed by a guest operating system; and (4) "alias" 2214, indicating that the monitor has created one or more physical alias pages for this page as a result of the physical page being mapped to multiple virtual-memory addresses. The significance of the presence of thash, ttag, and cover suspect instructions on a kernel text page, and the modifications of kernel text pages carried out by the monitor, are discussed in greater detail below.

Figure 23:
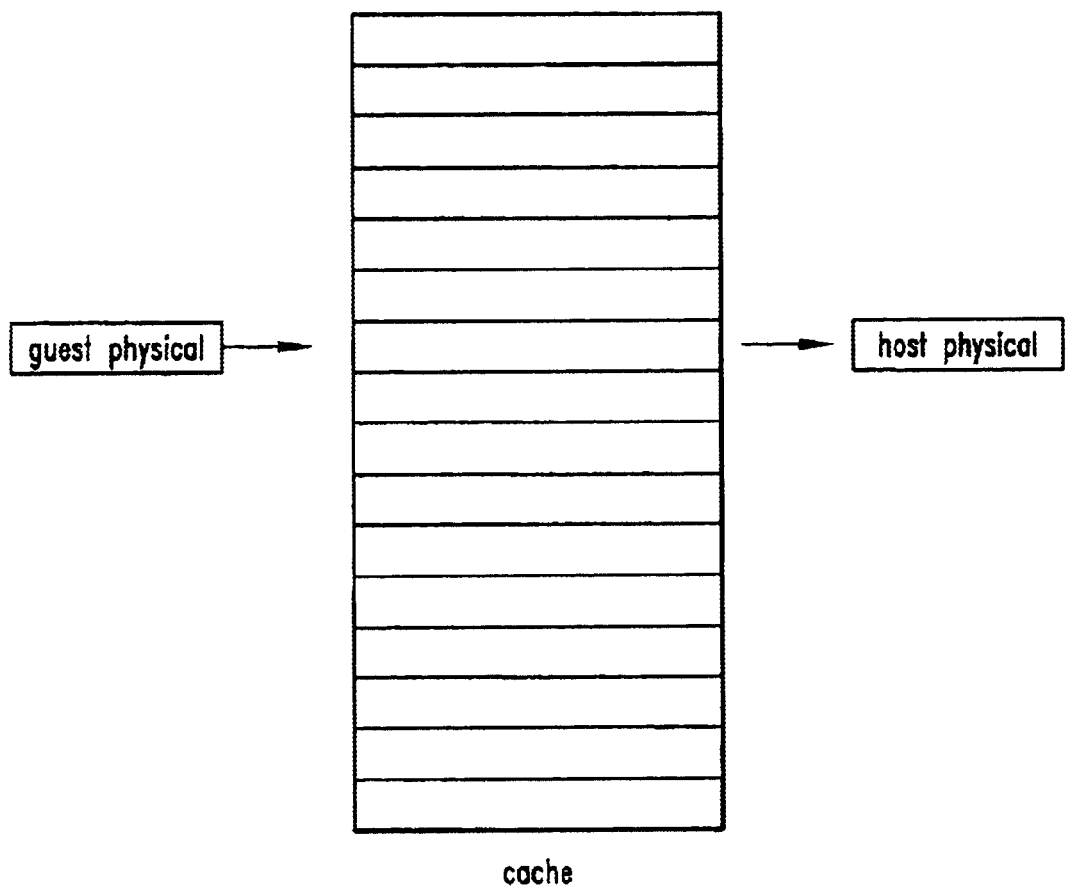
FIG. 23 illustrates a simple guest-physical-to-host-physical-address translation cache in one embodiment of the present invention.

The monitor maintains, in memory, a cache of guest-physical-to-host-physical-address translations. FIG. 23 illustrates a simple guest-physical-to-host-physical-address translation cache in one embodiment of the present invention. As with the preceding figure, more efficient, but more complex, implementations may be used by the monitor in order to provide rapid guest-physical-address-to-host-physical-address translations. For example, various hash-type or tree-structured data structures may be used, or a linear cache may be kept sorted in address order.

Figure 24:
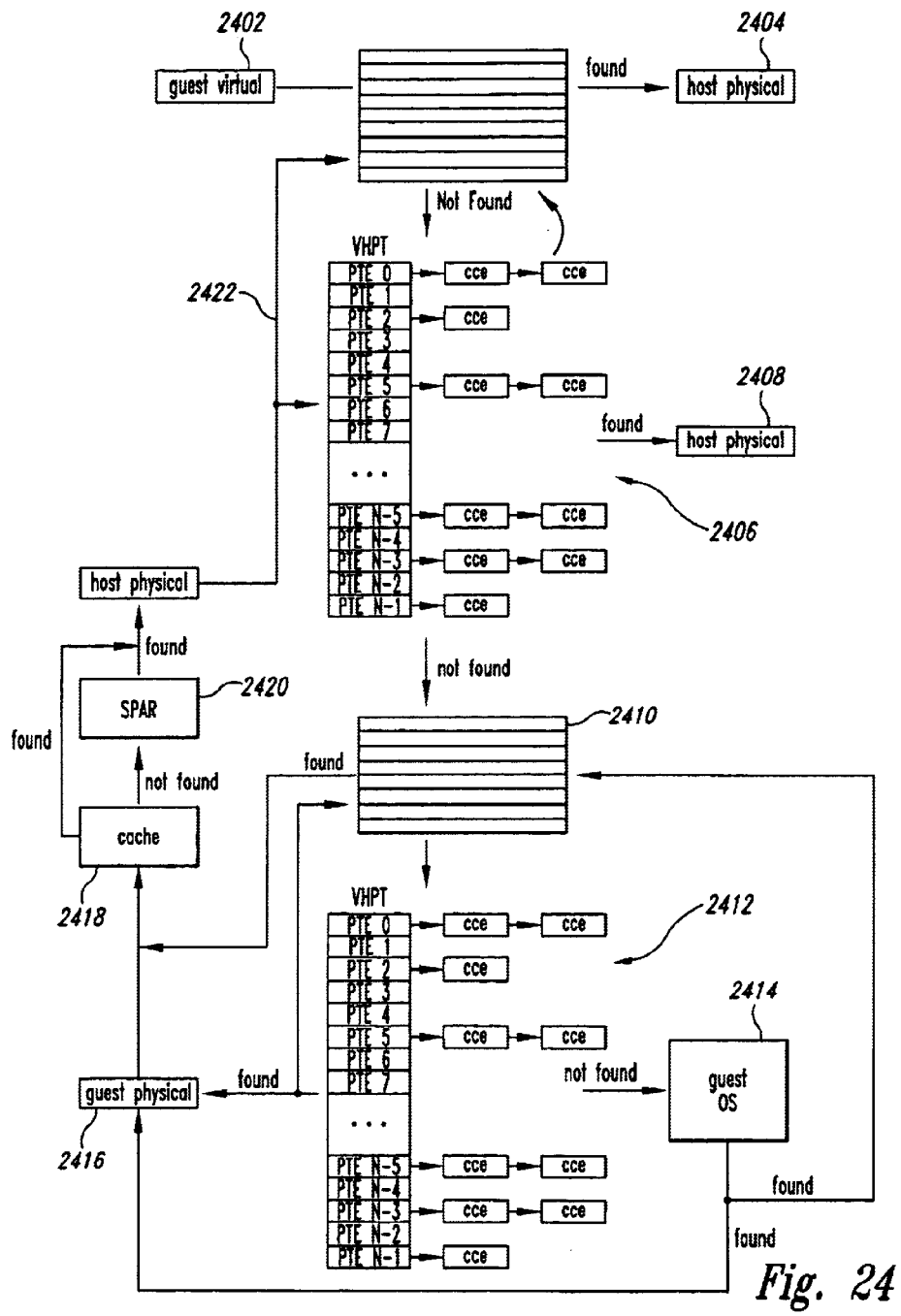
FIG. 24 is a flow-control-like illustration of guest-virtual-memory-address-to-host-physical-address translation carried out, in part, by a monitor on behalf of a guest operating system in one embodiment of the present invention.

With the basic data structures and resource partitionings described above, with reference to FIGS. 10–23, a detailed description of guest-virtual-memory-to-host-physical memory translation carried out within a system managed by a monitor can now be provided. FIG. 24 is a flow-control-like illustration of guest-virtual-memory-address-to-host-physical-address translation carried out, in part, by a monitor on behalf of a guest operating system in one embodiment of the present invention. The process starts with a guest virtual-memory address 2402 supplied by a guest as the address of an instruction to be executed or as the argument of a load, store, or other instruction requiring a virtual-memory-address argument. If a translation for the guest-operating-system-supplied virtual-memory address is found within the hardware TLB, then the corresponding host physical address 2404 is obtained automatically, without monitor intervention. Otherwise, the hardware walker consults the monitor's VHPT 2406 in order to locate a virtual-memory-to-host-physical-memory translation. If such as translation can be found in the monitor VHPT, then the corresponding host physical address 2408 is obtained without monitor intervention.

If the needed translation is not found in the monitor VHPT by the hardware walker, then the resulting TLB-miss fault is handled by the monitor. Note that, as defined above, the TLB includes both instruction and data translation caches, and a TLB-miss fault includes faults generated by instruction-translation-cache and data-translation-cache misses. First, the monitor consults the virtual TLB 2410 for the guest that executed the instruction resulting in the TLB-miss fault to determine if a guest-virtual-memory-to-guest-physical-memory translation can be found in the virtual TLB. If not, then if the guest operating system has turned on the virtual VHPT walker, the monitor searches the guest's virtual VHPT 2412 to find a guest-virtual-memory-to-guest-physical-memory translation for the supplied guest-virtual-memory-address 2402. If an appropriate translation is not found, then the monitor passes the TLB-miss fault to the guest operating system 2414, which resolves the TLB-miss fault. Upon resolving the TLB-miss fault, a guest-physical-memory address 2416 is produced corresponding to the originally supplied guest-virtual-memory address 2402. Note that that guest-physical-memory address is inserted into the TLB 2410 following guest-operating system resolution of the TLB-miss fault. A guest-physical-memory address is also obtained when the appropriate translation is found in the guest's virtual VHPT 2412 or guest's virtual TLB 2410. A guest-physical-memory address is subsequently translated by the monitor by first consulting the guest-physical-memory-address-to-host-physical-memory address-translation cache 2418 (also shown in FIG. 23) to locate a corresponding host physical-memory address. If such a host-physical-memory address cannot be found in the cache, then the monitor furnishes the guest-physical-memory address to the SPAR 2420, which then returns the corresponding host-physical-memory address. The host-physical-memory address can then be inserted, along with the originally supplied guest-virtual-memory address 2402, in a monitor VHPT entry and in the system TLB, as indicated by arrows 2422 in FIG. 24. In short, guest-virtual-memory-address translation employs the architecturally supported TLB and VHPT hardware walker features of the IA-64 architecture automatically, as intended for native operating system execution, and only invokes the additional virtual TLB and virtual guest VHPT when the virtual-memory-address-translation cannot be carried out automatically. This scheme therefore generally provides hardware-level efficiency for virtual-memory-address translation for guest programs executing in guest-operating-system execution environments above the monitor. As a result, a guest operating system generally observe a much lower frequency of TLB-miss faults, since the monitor VHPT essentially acts as a very large TLB for guest operating systems. In other words, the guest operating system assumes that, executing directly above hardware, a TLB-miss fault occurs when a guest-virtual-memory address is not found in the guest's TLB and the guest's VHPT, while, in fact, the monitor VHPT and hardware-level TLB provide an additional, and generally much larger, store of guest-virtual-memory address translations.

In general, once guest virtual-memory addresses are translated, according to the scheme described with reference to FIG. 24, the guest operating system, or applications running on top of the guest operating system, can freely execute instructions and access data stored at translated guest virtual-memory addresses. There are, however, a number of types of instructions that the monitor cannot allow guest operating systems and applications and operations running on top of guest operating systems to execute. A first class of instructions that the monitor cannot allow a guest operating system to execute are the privileged instructions. When a guest operating system attempts to execute a privileged instruction, the monitor is invoked via a privileged-instruction fault, since only the monitor runs at the most privileged privilege level, and replaces the privileged instruction with a branch instruction that transfers control to monitor code that, in certain cases, simulates, emulates, or enhances the privileged instruction, and in other cases, executes the privileged instruction on behalf of the guest operating system. This first class of instructions includes instructions that alter the states of system registers, and other instructions that, when executed by a guest operating system, may allow the guest operating system to change or access portions of the system state that would allow a guest operating system to affect execution of the monitor or other guest operating systems, access confidential monitor information, or otherwise transgress the boundaries assigned to the guest operating system by the monitor. A second class of instructions that the monitor cannot allow a guest operating system to execute are non-privileged instructions that nonetheless execute differently when execute by a process running at the most privileged privilege level than by a process running at a less privileged privilege level. This second class of instructions includes the ttag, thash, and cover instructions.

Figure 25:
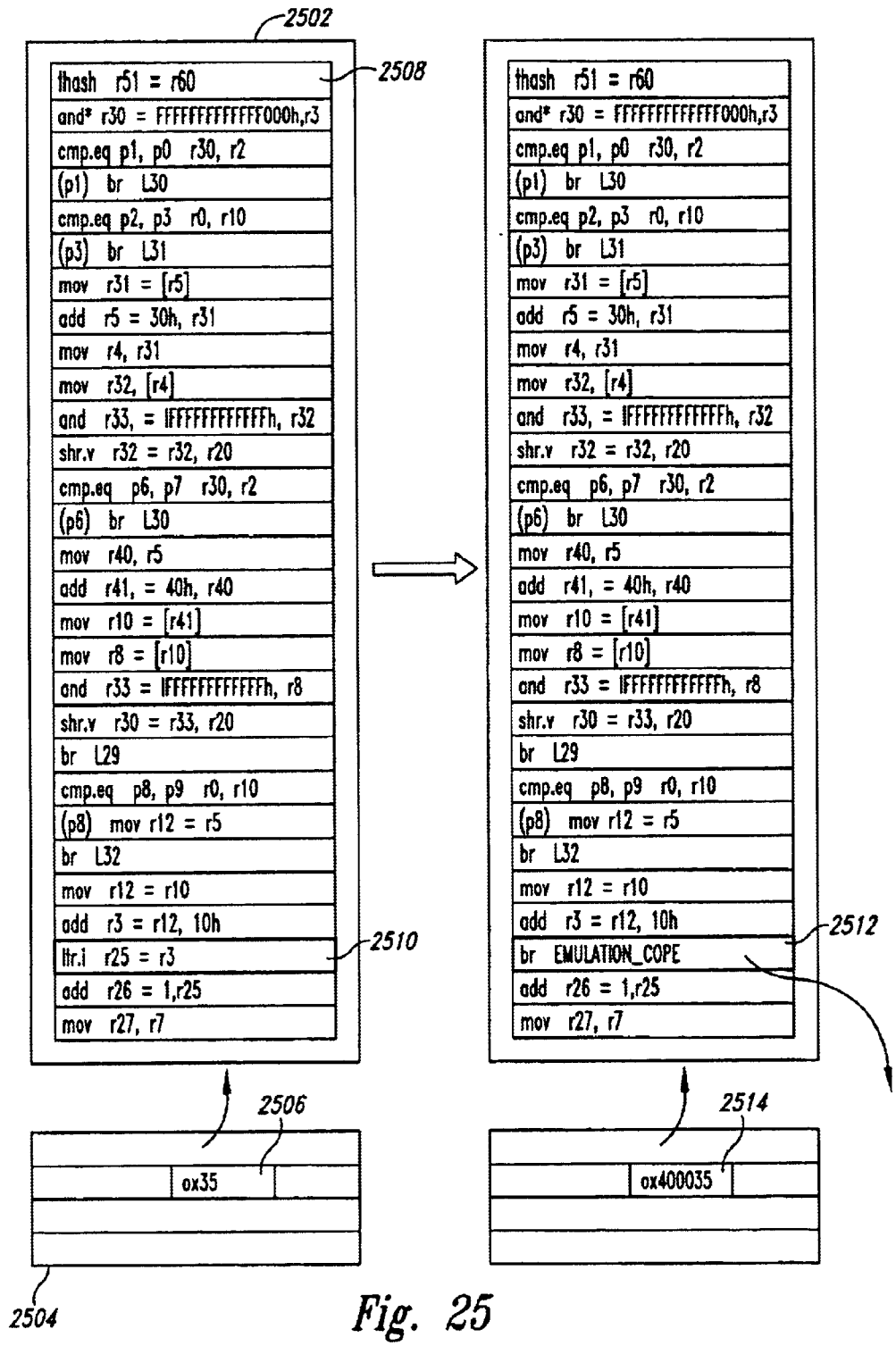
FIG. 25 shows a number of instructions resident within a virtual-memory page as a sequence of assembly-language instructions.
Figure 26:
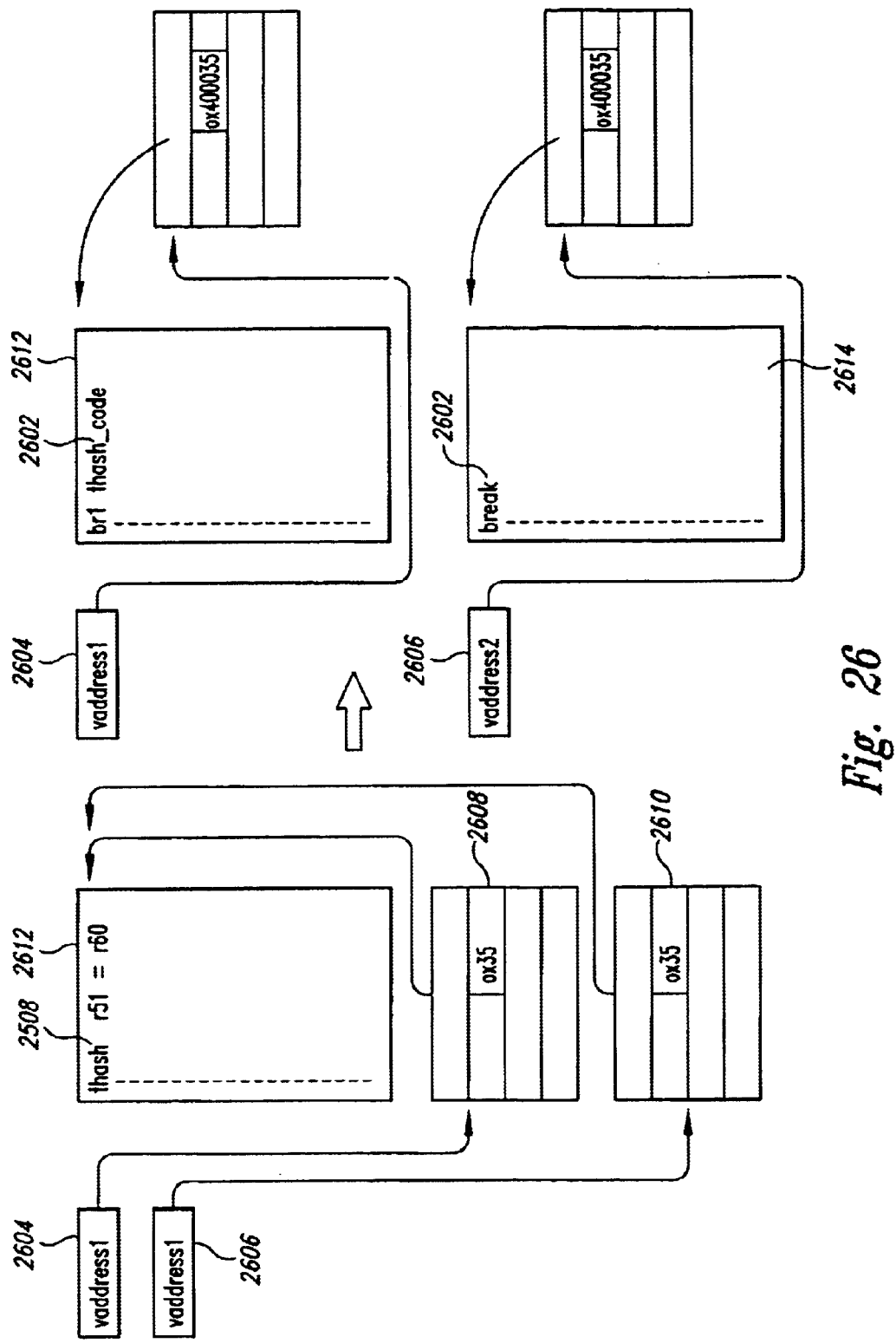
FIG. 26 illustrates monitor techniques for handling aliases, in one embodiment of the present invention.

FIGS. 25–26 illustrate a method by which the monitor intercepts and modifies certain types of instructions that the monitor cannot allow guest operating systems and applications running on top of guest operating systems to directly execute, in one embodiment of the present invention. In FIG. 25, a number of instructions resident within a virtual-memory page 2502 are shown as a sequence of assembly-language instructions. Of course, such instructions are encoded in binary numbers on an actual virtual-memory page, and a virtual-memory page would normally include far more instructions than shown in the exemplary virtual-memory page 2502 in FIG. 25. As shown in FIG. 25, there is a corresponding TLB or VHPT entry 2504 containing a protection-key 2506 used by a guest operating system to specify, in part, which processes may access the virtual-memory page. The virtual-memory page includes two instructions of interest, a thash instruction 2508 and an itr.i instruction 2510. The itr.i instruction 2510 is an example of a privileged instruction. This instruction enters a virtual-memory translation into a hardware translation register. Because the monitor controls the system resources, the monitor cannot let a guest operating system directly access the translation registers. Instead, as described above, the monitor provides a virtual TLB to each guest operating system. Thus, as shown in FIG. 25, privileged instructions, including itr.i instructions, need to be intercepted by the monitor so that the monitor can control access to system resources and can carry out any tasks required to simulate, emulate, or enhance privileged instructions on behalf of guest operating systems. The monitor scans the virtual-memory page and notes privileged instructions that may need to be simulated, emulated, or enhanced should a guest operating system attempt to execute them. If the guest operating system attempts to execute a privileged instruction on a guest kernel text virtual-memory page, the monitor replaces the privileged instruction, such as privileged instruction 2510, with a branch instruction to emulation code 2512. In the example in FIG. 25, the itr.i instruction is replaced, when the instruction is attempted to be execute with a branch to emulation code for the itr.i instruction. A particular privileged instruction is replaced with a branch to emulation code particular for that instruction. Note also, as described above, the monitor replaces the original protection-key 2506 with a modified protection-key 2514 having bit 22 of the protection-key toggled. When a guest operating system attempts to access the virtual-memory page, for example, to read the instructions encoded within the page, the monitor can intercept the access via a key-permission fault so that, rather than seeing the branch-to-emulation-code instruction that the monitor substituted for the original itr.i instruction, the monitor can return to the guest operating system the original itr.i instruction via permission-fault handling.

FIG. 26 illustrates monitor techniques for handling aliases, in one embodiment of the present invention, to physical pages and certain types of instructions that would not execute properly under the memory management scheme described above. First, notice in FIG. 26 that the thash instruction 2508 is replaced, by the monitor, with a branch instruction 2602 directing execution to emulation code. A thash instruction computes the address of a VHPT entry based, in part, on the address of the first entry in the VHPT. As discussed above, however, the monitor reserves the system PTA register for its own use. The guest operating system cannot therefore execute the thash instruction and expect to receive a resulting search tag that can be used for searching for entries within the guest virtual VHPT provided to the guest operating system by the monitor. Instead, the monitor replaces thash instructions with a branch instruction directing execution to emulation code, so that the monitor can intercept attempts to execute the thash instruction by guest operating systems, and emulate the thash instruction on behalf of the guest operating system. Note that the thash instruction is not a privileged instruction, so that replacement of thash instructions, and other non privileged instructions that should not be directly executed by guest operating systems, such tag and cover instructions, represents a second discrete mechanism by which the monitor facilitates the overall memory management scheme discussed above with reference to FIGS. 10–24.

A different problem arises when a guest operating instruction aliases a virtual-memory address. For example, in FIG. 26, the two different guest virtual-memory addresses 2604 and 2606 correspond to two different TLB entries 2608 and 2610 that both reference the same physical page 2612. The problem with virtual-memory-address aliasing is that certain instructions, including certain types of branch instructions, depend on relative displacements from a current virtual-memory address. When executed from different virtual-memory addresses, different displacements are calculated, and the branch therefore transfers control to different instructions depending on which alias was used for the branch-instruction address. In order to handle this situation, the monitor needs to physically copy the physical page 2612 to a different physical page 2614 that the monitor allocates to handle aliasing problem. Having copied the physical page and therefore obtaining two separate physical pages, the monitor can map each of the two original virtual-memory addresses 2604 and 2606 to a separate physical copy 2612 and 2614 of the physical page, as shown on the right hand side of FIG. 26. Branch instructions can now inserted into the physical page copies so that each branch instruction directs the processor to a single, correct target instruction. Note that virtual-memory-address aliasing is handled by the mechanism only with respect to branch instructions inserted by the monitor into guest-operating-system kernel text in place of privileged instructions or instructions such as ttag, thash, and cover in order to direct control to simulation or emulation code.

The monitor does not replace privileged instructions until an attempt by the guest operating system to execute the privileged instruction, and does not replace non-privileged instructions, such as ttag, thash, and cover, prior to an explicit attempt by a guest operating system to execute an instruction on the page containing the non-privileged instructions while running at the most privileged privilege level allowed to guest operating systems, namely privilege level 1. If the monitor were to replace these instructions en masse, prior to an attempt by a guest operating system to execute the instructions, then the monitor may inadvertently replace data that happened to have a data value equivalent to the encoding of an instruction. In other words, the monitor can only recognize unprivileged and privileged instructions for replacement when a guest operating system attempts to execute these instructions. Therefore, the monitor must carefully track virtual-memory pages mapped for guest operating systems and effect replacements only when necessary.

Figures 27A, 27B:
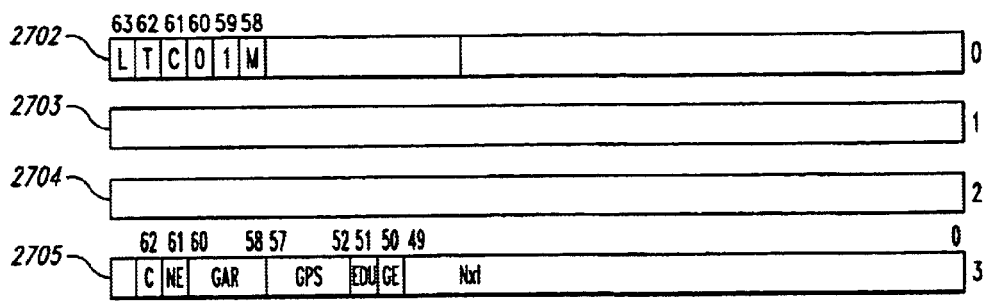
FIG. 27A illustrates individual bits and contiguous sets of bits, within ignored regions of virtual VHPT entries used by the monitor to track the state of guest virtual-memory pages in one embodiment of the present invention.
FIG. 27B shows the states and state encodings used by the monitor to track the state of guest virtual-memory pages in one embodiment of the present invention.

The monitor tracks guest virtual-memory pages by using two ignored regions within virtual TLB and virtual VHPT entries. FIG. 27A illustrates individual bits and contiguous sets of bits, within ignored regions of virtual VHPT entries used by the monitor to track the state of guest virtual-memory pages in one embodiment of the present invention. As shown in FIG. 27A, a VHPT entry comprises 4 64-bit words 2702–2705. The highest-order 6 bits within the first word fall within an ignored region and are used by the monitor as follows: (1) bit 63 is a lock bit, indicating whether or not the page table entry ("PTE") is currently being modified; (2) bit 62 indicates whether or not the PTE was filled from a virtualized translation register; (3) bit 61 indicates whether or not the page is coalesced with either a data-only or instruction-only page; (4) bit 60 indicates whether or not the page is data only; (5) bit 59 indicates whether or not the page is instruction-only; and (6) bit 58 indicates whether or not the page is valid, and can therefore have the present bit set. The fourth word of the PTE is ignored, and is used by the monitor as follows: (1) bit 62 indicates whether or not the page is a physical alias page; (2) bit 61 indicates whether or not the page table entry is pinned; (3) bit 60–58 are the guest's version of the access rights field; (4) bit 57–52 are the guest's version of the page-size field; (5) bit 51 indicates whether or not the guest's version of the page-size field must be obtained dynamically; (6) bit 50 is the guest's version of the ED field; and (7) bits 0–49 contain a physical pointer to the next collision-chain entry in the virtual VHPT.

Bits 58, 59, 60, and 61 from the first 64-bit word in a PTE, referred to as "M," "I," "D," and "C," respectively, together represent a value corresponding to a state for each guest virtual-memory page. FIG. 27B indicates the states and state encodings used by the monitor to track the state of guest virtual-memory pages in one embodiment of the present invention. These states include, as shown in FIG. 27B: (1) "unmapped," indicating that the corresponding PTE is not in use; (2) "mapped," indicating that the PTE corresponds to a normal guest page; (3) "instruction-only unmapped," indicating that the virtual-memory page is a guest kernel text page that has never been executed or is in conflict with a data-page translation register, the PTE having a present field of 0 to trigger a page-not-present fault in the case that an instruction within the page is attempted to be executed; (4) "instruction-only mapped," indicating a guest kernel text page for which the monitor has substituted a monitor-exclusive protection-key to prevent direct READ/WRITE access by a guest operating system, (5) "data-only unmapped," indicating that the corresponding virtual-memory page represents a guest kernel data page that has been inserted but never accessed or that is in conflict with an instruction translation register, the PTE having a present field of 0 in order to trigger a page-not-present fault in the case of the page's access by a guest operating system; (5) "data-only mapped," indicating that the corresponding virtual-memory page is a guest kernel text or data page that contains a suspect non-privileged instruction, such as thash, ttag, or cover, that must be replaced by a branch instruction directing execution to emulation code by the monitor should the instruction be attempted to be executed by a guest operating system; (7) "CIM," indicating that the page is mapped, but is coalesced with one or more pages in the instruction-only mapped state; and (8) "CDM," indicating that the page is mapped, but is coalesced with pages in the data-only mapped state. Note that, when possible, the monitor attempts to coalesce small pages into larger pages to minimize the TLB-miss faults.

Figure 28A:
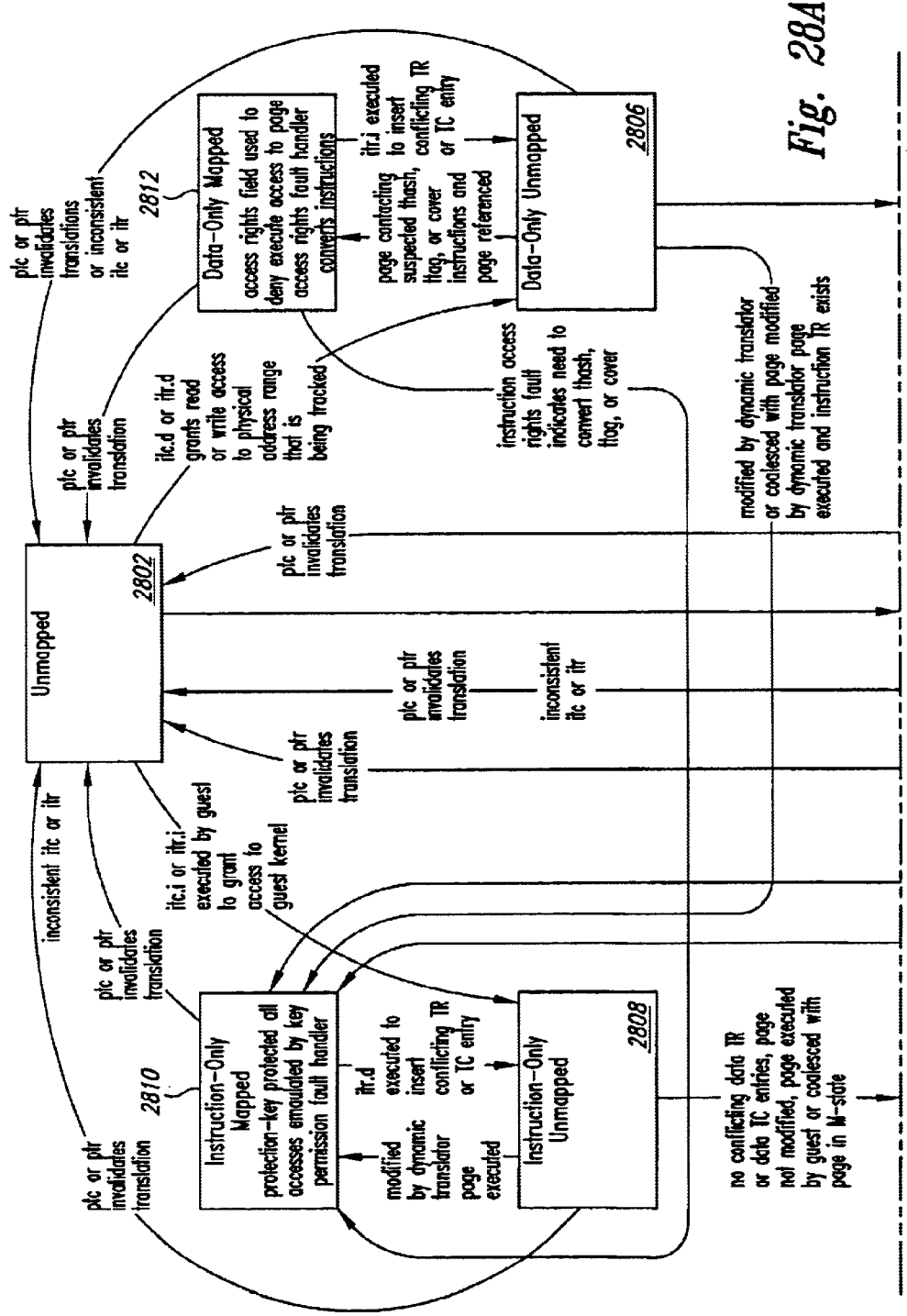
FIG. 28 is a complete state-transition diagram for guest-memory pages in one embodiment of the present invention.
Figure 28B:
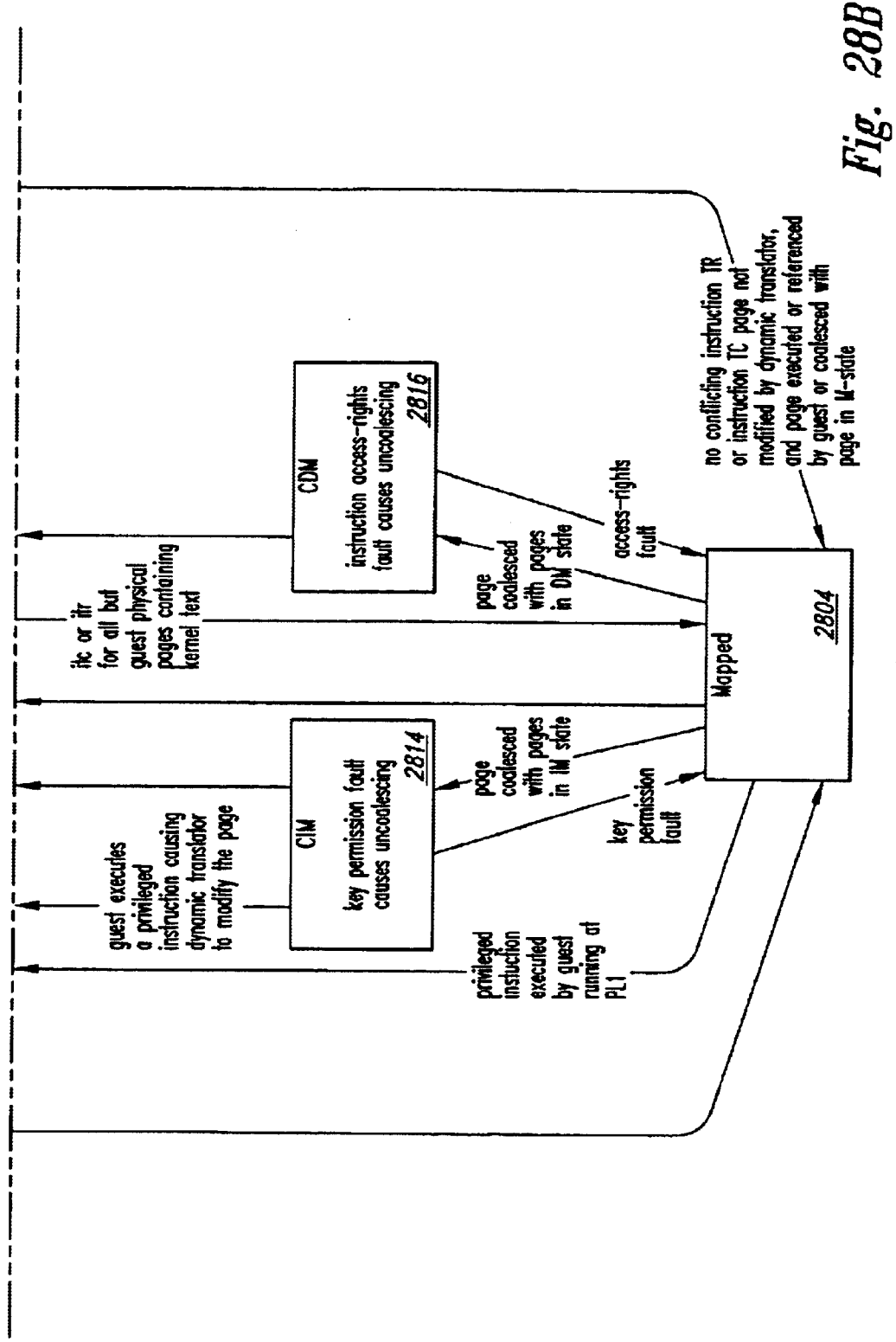

FIG. 28 is a complete state-transition diagram for guest-memory pages in one embodiment of the present invention, with the states encoded in the CDIM bits of an ignored region of a guest virtual PTE entry, as discussed above with reference to FIGS. 27A–B. A guest-virtual VHPT entry is in the unmapped state 2802, prior to use. The unmapped state indicates that the PTE is not defined, or unused. When a guest operating system attempts to execute an itc or itr instruction in order to cache a virtual-memory-to-physical-memory-address translation, the monitor intercepts the attempt to execute the itc or itr instruction and emulates the instruction, entering the guest-virtual-memory-to-guest-physical-memory translation into a VHPT entry, and setting the state for the virtual-memory page. In general, the state is set to mapped 2804. However, if the page contains suspect thash, ttag or cover instructions and is being tracked by the monitor using the page-tracking data structure discussed with reference to FIG. 22, then the guest virtual PTE entry is set to indicate that the guest virtual-memory page is in the data-only unmapped state 2806. Similarly, if the page is a guest physical page containing kernel text and includes privileged instructions that have been replaced with branches to emulation code, the virtual-memory page is placed into the instruction-only unmapped state 2808. When a page in the instruction-only unmapped state 2808 contains an instruction that is attempted to be executed by the guest operating system, the monitor modifies the corresponding protection-key to protect the page from direct access by a guest operating system, as discussed above, and places the virtual-memory page in the instruction-only mapped state 2810. Similarly, when a virtual-memory page in the data-only unmapped state is attempted to be accessed by a guest operating system, the virtual-memory page is placed in the data-only mapped state 2812 with the access-rights field overwritten to deny execute access to the page so that suspect thash, ttag, and cover instructions can be replaced with branch instruction directing execution to emulation code by an access-rights fault handler. Virtual-memory pages in the instruction-only mapped and data-only mapped states can revert to the instruction-only unmapped and data-only unmapped state, respectively, when a conflicting translation is placed in the TLB via an itr.d or itr.i instruction. A conflicting translation is a translation that differs from an already resident translation in a significant aspect, including having different corresponding physical address or access rights. When mapped pages are coalesced with pages in the instruction-only mapped and data-only mapped states, respectively, then the mapped page transitions to the CIM state 2814 or CDM state 2816, respectively. From these coalesced states, the page may revert to the map state upon key permission or access-rights faults. Pages in the instruction-only unmapped 2808 and data-only unmapped 2806 states can transition to the mapped state 2804 in cases in which instructions need not be emulated or replaced.

Although the present invention has been described in terms of a particular embodiment, it is not intended that the invention be limited to this embodiment. Modifications within the spirit of the invention will be apparent to those skilled in the art. For example, the monitor may support concurrent execution of multiple operating systems, rather than two operating systems shown in many of the above-described figures. The guest-physical-address-to-host-physical-address mapping can be encoded by the monitor into any number of different data structures. Arrays indexed by guest-physical page numbers, sparse arrays, associative memory, and many other techniques can be used to store and maintain the mapping. Many different possible techniques can be employed to simulate and enhance privileged instructions by the monitor. The monitor may maintain separate VHPTs for each guest operating system, or may employ a single, large VHPT for all guest operating systems. Many different types of virtual memory addressing contexts may be stored and maintained for each guest operating system by the monitor.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for efficiently translating virtual-memory addresses to physical-memory addresses in a computer system serving as a platform for execution of a number of guest operating systems, the method comprising:
   providing a monitor;
   partitioning a machine-architecture-supplied virtual-address space into separate virtual-address-space partitions for use by the guest operating systems and the monitor, each virtual-address-space partition used by one of a guest operating system or the monitor;
   running the monitor at a privilege level more privileged than any privilege level at which a guest operating system runs; and
   intercepting, by the monitor, attempts by the guest operating systems to execute virtual-memory related instructions in order to
      create and maintain a guest-physical-address-to-host-physical-address map for each guest operating system; and
      translate guest-virtual-memory addresses, within a virtual-address-space partition allocated by the monitor to the guest operating system, to host physical addresses.

2. The method of claim 1 wherein the monitor provides a virtual machine to each guest operating system.

3. The method of claim 1 further including partitioning a machine-architecture-supplied virtual-address space into virtual-address-space partitions by partitioning a range of region identifiers provided by the host processor architecture into region-identifier-subrange partitions, each region-identifier-subrange partition used by one:
   of a guest operating system; and
   the monitor.

4. The method of claim 3 further including partitioning a range of region identifiers provided by a processor architecture into a number of smaller region-identifier-subrange partitions, wherein the range of region identifiers is encoded in a first number of bits, $n_1$, and the smaller region-identifier-subranges are encoded in a smaller, second number of bits, $n_2$, providing $2^{(n1-n2)}$ smaller region-identifier-subranges.

5. The method of claim 1 further including partitioning virtual memory into partitions accessible to the monitor and a guest operating system and into partitions accessible only to the monitor by partitioning a range of protection keys provided by a processor architecture into protection-key-subrange partitions.

6. The method of claim 5 further including partitioning the range of protection keys provided by the processor architecture into a number of smaller protection-key partitions, wherein the range of protection keys is encoded in a first number of bits, $n_1$, and the smaller protection-key-subranges are encoded in a smaller, second number of bits, $n_2$, providing $2^{(n1-n2)}$ smaller protection-key-subranges.

7. The method of claim 6 further including replacing a guest-operating-system protection key, associated with a virtual-memory page, with a corresponding monitor protection key by the monitor in order to intercept, by the monitor, guest-operating-system access to the virtual-memory page.

8. The method of claim 1 further including writing, by the monitor, a region identifier reserved for guest-operating-system-physical-addressing-mode operation into a region register when a guest operating system enables physical-mode operation.

9. The method of claim 1 further including maintaining, by the monitor, a separate virtual page table for each guest operating system, allowing for machine-level translation-cache and virtual-page-table searching for virtual-address translations.

10. The method of claim 1, when the monitor can't resolve a memory fault, resolving the memory fault by the guest operating system by the monitor.

11. The method of claim 1 further including:
   identifying, as replaceable instructions, non-privileged instructions that execute differently when executed by a process running at the most privileged privilege level and when executed by a process running at a lower privilege level; and
   when a guest operating system, running at guest-operating-system-kernel privilege, attempts to execute a memory page that includes a replaceable instruction, scanning the memory page and replacing replaceable operations with branch instructions directed to monitor code.

12. The method of claim 11 further including:
   replacing the guest-operating-system-assigned protection key associated with the memory page with a monitor protection key, so that subsequent access to the memory page by the guest operating system results in a key-permission fault that is intercepted by the monitor.

13. The method of claim 12 further including:
upon intercepting a key-permission fault resulting from an attempt by the guest operating system to access the memory page, restoring the original, replaceable instructions prior to allowing the guest operating system to access the memory page.

14. The method of claim 11 wherein, when more than one virtual-memory address is associated with the memory page, physically aliasing the memory page by copying the memory page to another memory page.

15. The method of claim 1 further including:
identifying, as access-rights modifiable memory pages, those memory pages with associated original access rights that, when accessed by a guest operating system running at a guest-kernel privilege level, result in access rights different from the access rights that would be provided to a process running at the most privileged privilege level by the original access rights; and
replacing the access rights associated with the memory pages with substitute access rights that provide access rights to the guest operating system running at a guest-kernel privilege level that would be provided to a process running at the most privileged privilege level by the original access rights.

16. The method of claim 1 further including translating a guest-operating-system virtual-memory address to a host-physical address by:
when the guest virtual-memory address is found in a hardware translation cache, returning a corresponding host-physical address from the hardware translation cache;
when the guest virtual-memory address is not found in the hardware translation cache, but is found in a hardware-referenced virtual hash page table, returning a corresponding host-physical address from the hardware-referenced virtual hash page table; and
when the guest virtual-memory address is found neither in the hardware translation cache nor in the hardware-referenced virtual hash page table,
when the guest virtual-memory address is found in one of a virtual translation cache or a guest virtual hash page table maintained for the guest operating system by the monitor, returning a host physical address corresponding to a guest physical address found in one of the virtual translation cache or guest virtual hash page table, and
when the guest virtual-memory address is found in neither the virtual translation cache nor the guest virtual hash page table maintained for the guest operating system by the monitor,
passing a translation-cache-miss fault to a guest operating system,
resolving the guest virtual-memory address to a guest physical address by the guest operating system, and
returning a host physical address corresponding to the guest physical address.

17. The method of claim 1 further including:
when a guest operating system attempts to execute a privileged instruction, intercepting the attempted execution by the monitor through a privileged-instruction fault and replacing the privileged instruction with a branch instruction directed to monitor code.

18. A computer system that serves as a platform for executing a number of guest operating systems and that efficiently translates virtual-memory addresses to physical addresses on behalf of guest operating systems by the method of claim 1.

19. A computer readable medium containing computer instructions for carrying out the method of claim 1.

20. Electronic signals embodied in a carrier wave that encode computer instructions for carrying out the method of claim 1.

21. A monitor and hardware computer system comprising:
one or more processors that provide multiple privilege levels, translation caches, and machine-support for searching translation caches and virtual page tables;
system memory; and
a monitor that runs within the computer system at a privilege level more privileged than any privilege levels at which guest operating systems run within the computer system, the monitor
partitioning virtual-address space into partitions, each partition used by one of the monitor or a guest operating system;
constructing and maintaining a map for each guest operating system containing indications of host physical memory pages corresponding to guest-operating-system virtual physical memory pages; and
substituting host physical addresses for guest virtual physical addresses in translation caches and virtual page tables so that machine-level virtual-address-translation features of the computer system, including translation-cache and virtual-page-table searches, can be carried out on behalf of the guest operating systems.

* * * * *